(12) United States Patent
Wu et al.

(10) Patent No.: US 12,719,764 B2
(45) Date of Patent: Aug. 25, 2026

(54) CONVERSATIONAL ASSISTANT FOR TROUBLESHOOTING A SITE

(71) Applicant: Juniper Networks, Inc., Sunnyvale, CA (US)

(72) Inventors: Xiaoying Wu, Sunnyvale, CA (US); Kush Shah, Santa Clara, CA (US); Meenal Prakash Negi, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 336 days.

(21) Appl. No.: 18/343,914

(22) Filed: Jun. 29, 2023

(65) Prior Publication Data

US 2024/0137289 A1 Apr. 25, 2024
US 2024/0235955 A9 Jul. 11, 2024

Related U.S. Application Data

(60) Provisional application No. 63/380,314, filed on Oct. 20, 2022.

(51) Int. Cl.
*H04L 41/22* (2022.01)
*H04L 41/0604* (2022.01)
(Continued)

(52) U.S. Cl.
CPC .......... *H04L 41/22* (2013.01); *H04L 41/0609* (2013.01); *H04L 41/0631* (2013.01); *H04L 41/5009* (2013.01)

(58) Field of Classification Search
CPC . H04L 41/22; H04L 41/0609; H04L 41/0631; H04L 41/5009; H04L 41/0823;
(Continued)

(56) References Cited

U.S. PATENT DOCUMENTS 5,941,978 A 8/1999 Finni et al.
6,496,979 B1 12/2002 Chen et al.
(Continued)

FOREIGN PATENT DOCUMENTS

CN 105359144 A 2/2016
CN 106164889 A 11/2016
(Continued)

OTHER PUBLICATIONS

Response to Extended Search Report dated Feb. 5, 2024, from counterpart European Application No. 23194911.6 filed Oct. 8, 2024, 28 pp.

(Continued)

*Primary Examiner* — Brian J. Gillis
*Assistant Examiner* — Juan C Turriate Gastulo
(74) *Attorney, Agent, or Firm* — Shumaker & Sieffert P.A.

(57) ABSTRACT

A network management system (NMS) is described that includes one or more processors coupled to memory storing network data. The one or more processors are configured to receive a query identifying a site and determine, based on the network data, a first set of troubleshooting issues for a wide area network (WAN) deployment at the site, a second set of troubleshooting issues for a wireless deployment at the site, and a third set of troubleshooting issues for a wired deployment at the site. The one or more processors are configured to determine, based on a user experience metric, a first troubleshooting issue from the first set of troubleshooting issues for the WAN deployment, a second troubleshooting issue from the second set of troubleshooting issues for the wireless deployment, and a third troubleshooting issue from the third set of troubleshooting issues for the wired deployment.

20 Claims, 8 Drawing Sheets

(51) Int. Cl.
*H04L 41/0631* (2022.01)
*H04L 41/5009* (2022.01)

(58) Field of Classification Search
CPC ............. H04L 41/0654; H04L 41/0895; H04L 43/0811; H04L 41/0806; H04L 41/122; H04L 41/14; H04L 41/16; H04L 43/0817; H04L 43/20; H04L 43/08; H04L 41/5067
See application file for complete search history.

(56) References Cited

U.S. PATENT DOCUMENTS 7,715,329 B1 5/2010 Breslau et al.
7,733,787 B1 6/2010 Paterson et al.
8,291,324 B2 10/2012 Battat et al.
8,700,875 B1 4/2014 Barron et al.
8,773,979 B2 7/2014 Chueh et al.
8,862,997 B2 10/2014 Torii
8,903,365 B2 12/2014 Stricklen et al.
9,448,992 B2 9/2016 Shmiel et al.
9,729,439 B2 8/2017 MeLampy et al.
9,729,682 B2 8/2017 Kumar et al.
9,762,485 B2 9/2017 Kaplan et al.
9,766,818 B2 9/2017 Choi et al.
9,832,082 B2 11/2017 Dade et al.
9,871,748 B2 1/2018 Gosselin et al.
9,985,883 B2 5/2018 MeLampy et al.
10,019,305 B2 7/2018 Aneja et al.
10,198,511 B1 2/2019 Gupta et al.
10,200,264 B2 2/2019 Menon et al.
10,277,506 B2 4/2019 Timmons et al.
10,381,008 B1 8/2019 Ho et al.
10,432,522 B2 10/2019 Kaplan et al.
10,489,463 B2 11/2019 Potharaju et al.
10,756,983 B2 8/2020 Ratkovic et al.
10,862,742 B2 12/2020 Singh
10,958,537 B2 3/2021 Safavi
10,958,585 B2 * 3/2021 Safavi .................. H04L 41/069
10,985,969 B2 4/2021 Safavi
10,992,543 B1 4/2021 Rachamadugu et al.
11,075,824 B2 7/2021 McCulley et al.
11,496,373 B2 11/2022 Wu et al.
11,563,858 B1 1/2023 Rosen
11,695,642 B2 * 7/2023 Bhat .................... H04L 41/149
709/224
2003/0009552 A1 1/2003 Benfield et al.
2003/0110413 A1 6/2003 Bernklau-Halvor
2004/0018857 A1 1/2004 Asokan et al.
2004/0088701 A1 5/2004 Hatalkar et al.
2006/0059125 A1 3/2006 Yan
2007/0043844 A1 2/2007 Sakai
2007/0192085 A1 8/2007 Roulland et al.
2007/0208837 A1 9/2007 Tian et al.
2008/0095327 A1 4/2008 Własiuk
2008/0294423 A1 11/2008 Castellani et al.
2010/0125753 A1 5/2010 Gadher
2010/0153426 A1 6/2010 Kim et al.
2010/0185669 A1 7/2010 Hall et al.
2010/0318847 A1 12/2010 Beg et al.
2011/0112827 A1 5/2011 Kennewick et al.
2011/0167298 A1 7/2011 Lee
2011/0296000 A1 12/2011 Ferris et al.
2012/0303790 A1 11/2012 Singh et al.
2013/0067023 A1 3/2013 Jov et al.
2013/0198412 A1 8/2013 Saito
2014/0136013 A1 5/2014 Wolverton et al.
2014/0192676 A1 * 7/2014 Sullivan .................. H04L 41/12
370/254
2015/0063339 A1 3/2015 Han et al.
2015/0066479 A1 3/2015 Pasupalak et al.
2015/0127174 A1 5/2015 Quam
2015/0215177 A1 7/2015 Pietrowicz
2015/0378987 A1 12/2015 Sekar
2016/0080502 A1 3/2016 Yadav et al.
2016/0218911 A1 7/2016 Wessels et al.
2016/0269895 A1 9/2016 Soini et al.
2016/0357421 A1 12/2016 Milden
2016/0373306 A1 12/2016 Saha et al.
2017/0302554 A1 10/2017 Chandrasekaran et al.
2018/0013500 A1 1/2018 Liao et al.
2018/0032216 A1 2/2018 Naous
2018/0032890 A1 2/2018 Podgorny et al.
2018/0096683 A1 4/2018 James et al.
2018/0121808 A1 5/2018 Ramakrishna et al.
2018/0295013 A1 * 10/2018 Deb ...................... G06F 16/248
2018/0359651 A1 12/2018 Mota et al.
2018/0365327 A1 12/2018 Li et al.
2019/0005422 A1 1/2019 Lee
2019/0058627 A1 2/2019 Collins et al.
2019/0228296 A1 7/2019 Gefen et al.
2019/0266253 A1 8/2019 Maiti et al.
2019/0278689 A1 9/2019 Perea et al.
2019/0280949 A1 9/2019 Wang et al.
2019/0347282 A1 * 11/2019 Cai ........................ G06N 5/022
2019/0369574 A1 12/2019 Val
2020/0134188 A1 4/2020 Bagheri et al.
2020/0136924 A1 4/2020 Roy et al.
2020/0151583 A1 5/2020 Mueller et al.
2020/0241949 A1 7/2020 Basu et al.
2020/0304364 A1 9/2020 Tapia et al.
2021/0028998 A1 1/2021 Khetarpal et al.
2021/0158814 A1 5/2021 Hussain et al.
2021/0193137 A1 6/2021 Smith
2021/0218594 A1 7/2021 Sundararajan et al.
2021/0234754 A1 7/2021 Golla et al.
2021/0250262 A1 8/2021 Ghouse Mohaddin
2021/0306201 A1 9/2021 Wang et al.
2021/0328877 A1 10/2021 Jung et al.
2021/0349977 A1 11/2021 Kishikawa et al.
2021/0385143 A1 * 12/2021 Chandrasekaran ..... H04L 47/28
2022/0121660 A1 4/2022 George et al.
2022/0182278 A1 6/2022 Vangapalli et al.
2022/0208188 A1 6/2022 Yoffe et al.
2022/0269678 A1 8/2022 Li et al.
2022/0337495 A1 10/2022 Safavi
2023/0016199 A1 1/2023 Jividen et al.
2023/0132033 A1 * 4/2023 Gupta ................... G06F 11/366
717/120
2023/0231776 A1 7/2023 Wang et al.

FOREIGN PATENT DOCUMENTS

CN 110489653 A 11/2019
EP 3447662 A1 2/2019
EP 4033392 A1 7/2022
EP 4072188 A1 10/2022
WO 2014145818 A1 9/2014
WO 2015084759 A1 6/2015
WO 2020214714 A1 10/2020

OTHER PUBLICATIONS

Extended Search Report from counterpart European Application No. 23194911.6 dated Feb. 5, 2024, 12 pp.
"Mesh test results," Posted by jwnpgh on Apr. 22, 2018, Retrieved from: https://www.reddit.com/r/GoogleWiFi/comments/8e687t/mesh_test_results/, 1 pp.
Aruba: "Aruba Central User Guide", 1-20 Feb. 1, 2017 (Feb. 1, 2017), XP055593282, Retrieved from the Internet: URL: https://community.arubanetworks.com/aruba/attachments/aruba/SoftwareUserReferenceGuides/82/1/aruba%20central%20user%20guide.pdf [retrieved on Jun. 3, 2019], pp. 1-190.
Bryant, What is Google Wifi and How Do I Get Started, Posted on Groovy Post, Retrieved Jan. 26, 2022 from: https://web.archive.org/web/20200930061436/https://www.groovypost.com/howto/what-is-googlewifi-and-how-do-i-get-started/, Aug. 26, 2019, 7 pp.
U.S. Appl. No. 17/647,954, filed Jan. 13, 2022, by Wang et al.

(56) References Cited

OTHER PUBLICATIONS

Xue-Ren et al., "Spatial Data Semantic Search Based on Solr", Geomatics & Spatial Information Technology, vol. 39, No. 2, Information Engineering University, Zhengzhou, China, Feb. 2016, 4 pp.

* cited by examiner

CONVERSATIONAL ASSISTANT FOR TROUBLESHOOTING A SITE

This application claims the benefit of U.S. Provisional Patent Application No. 63/380,314, filed 20 Oct. 2022, the entire contents of which is incorporated herein by reference.

TECHNICAL FIELD

The disclosure relates generally to computer networks and, more specifically, to monitoring and troubleshooting computer networks.

BACKGROUND

Commercial premises or sites, such as offices, hospitals, airports, stadiums, or retail outlets, often install complex wireless network systems, including a network of wireless access points (APs), throughout the premises to provide wireless network services to one or more wireless client devices (or simply, "clients"). APs are physical, electronic devices that enable other devices to wirelessly connect to a wired network using various wireless networking protocols and technologies, such as wireless local area networking protocols conforming to one or more of the IEEE 802.11 standards (i.e., "Wi-Fi"), Bluetooth/Bluetooth Low Energy (BLE), mesh networking protocols such as ZigBee or other wireless networking technologies. Many different types of wireless client devices, such as laptop computers, smartphones, tablets, wearable devices, appliances, and Internet of Things (IoT) devices, incorporate wireless communication technology and can be configured to connect to wireless access points when the device is in range of a compatible wireless access point in order to access a wired network. In the case of a client device running a cloud-based application, such as voice over Internet Protocol (VOIP) applications, streaming video applications, gaming applications, or video conference applications, data is exchanged during an application session from the client device through one or more APs and one or more wired network devices, e.g., switches, routers, and/or gateway devices, to reach the cloud-based application server.

SUMMARY

In general, this disclosure describes one or more techniques for a network management system (NMS) to identify network issues occurring within a particular network site and provide a summary indicating what issues, if any, have occurred for each of a wide area network (WAN), wired, and wireless deployment of the particular network site. For each type of deployment (e.g., wireless, wired, WAN), the summary may indicate a respective set of issues (e.g., one or more issues). For example, for a wireless deployment, issues may include authentication failures, poor coverage, and/or access point (AP) disconnects. For each deployment type of a given site, the NMS may classify each issue into a troubleshooting category (e.g., a client category, a connectivity category, and a device health category). For instance, the NMS may classify each issue into one of a client category, a connectivity category, or a device health category for a wireless deployment. For each troubleshooting category, the NMS may use a user experience metric, such as, for example, a service level expectation (SLE) score as an indicator (e.g., a primary indicator) to rank a top issue for each deployment. In some examples, the NMS may rank a top issue for each of the deployments (e.g., a top issue for each of wireless, wired, and WAN) based on the SLE score. The NMS may only display the top issue in each troubleshooting category or a set number of top issues in each troubleshooting category (e.g., 2 issues, 3 issues, etc.). Additionally, or alternatively, the NMS may rank a single top issue across all deployments (e.g., a top issue for each of wireless, wired, and WAN) based on the SLE score.

In accordance with the techniques of the disclosure, an NMS may identify an issue experienced by client devices on a site based on network data or simply "data" collected from network devices within a wireless deployment of the site. For instance, the NMS may determine that client devices on a site experienced Ethernet error issues based on data collected from access point (AP) devices within a wireless deployment of the site. As a further example, the NMS may identify an issue experienced by a switch on the site based on data collected from network devices within a wired deployment of the site. For instance, the NMS may determine that the switch on the site experienced a switch disconnect issue based on data collected from switches and routers within a wired deployment of the site. The NMS may cause an output of a top issue for each deployment. For instance, the NMS may output a visual indication in a conversational assistant of the Ethernet error in response to determining that the Ethernet error has a highest SLE score for the wireless deployment. Similarly, the NMS may output a visual indication in the conversational assistant of the switch disconnect issue in response to determining that the switch disconnect issue has a highest SLE score for the wired deployment.

The disclosed techniques enable troubleshooting of a site by identifying network issues at each deployment. For example, the NMS may access not only wireless data to determine issues at a site, but may further access wired data and/or WAN data. In this way, the NMS may determine wired issues and/or WAN issues, which may help to reduce an amount of time an administrator spends troubleshooting a site. Moreover, troubleshooting WAN, wireless, and wired deployments together, the NMS may identify a root cause for all deployment types more quickly compared to systems that identify a root cause using only data from a wireless deployment. Moreover, the NMS may recommend an action in the conversational assistant to quickly resolve the issue (s).

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1A:
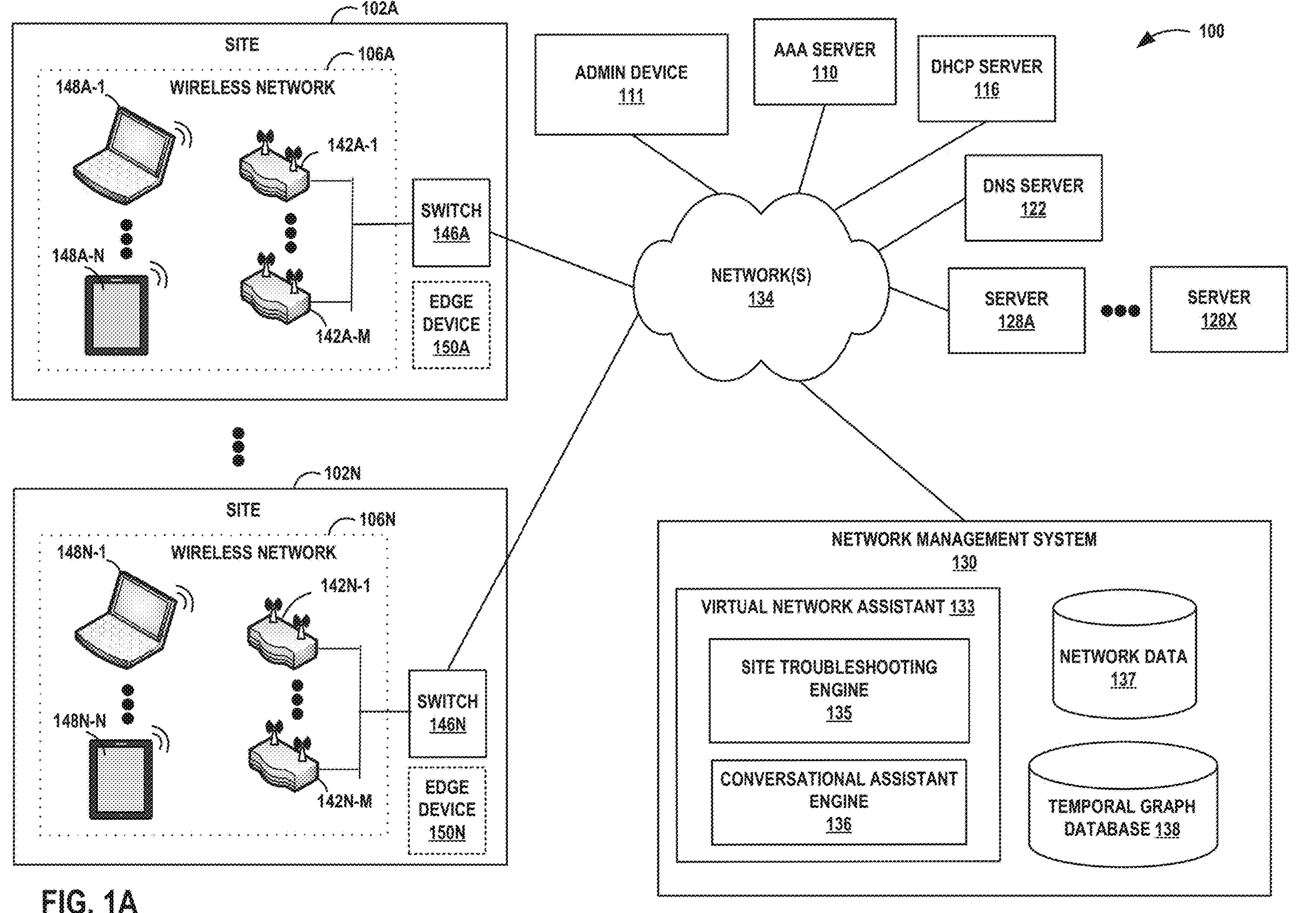
FIG. 1A is a block diagram of an example network system in which a network management system provides troubleshooting for a site, in accordance with one or more techniques of the disclosure.

FIG. 1A is a block diagram of an example network system 100 in which a network management system (NMS) 130 provides troubleshooting for a site, in accordance with one or more techniques of this disclosure. Example network system 100 includes a plurality sites 102A-102N at which a network service provider manages one or more wireless networks 106A-106N, respectively. Although in FIG. 1A each site 102A-102N is shown as including a single wireless network 106A-106N, respectively, in some examples, each site 102A-102N may include multiple wireless networks, and the disclosure is not limited in this respect.

Each site 102A-102N includes a plurality of network access server (NAS) devices, such as access points (APs) 142, switches 146, or routers (not shown) within the wired network edge. For example, site 102A includes a plurality of APs 142A-1 through 142A-M. Similarly, site 102N includes a plurality of APs 142N-1 through 142N-M. Each AP 142 may be any type of wireless access point, including, but not limited to, a commercial or enterprise AP, a router, or any other device that is connected to the wired network and is capable of providing wireless network access to client devices within the site.

Each site 102A-102N also includes a plurality of client devices, otherwise known as user equipment devices (UEs), referred to generally as UEs or client devices 148, representing various wireless-enabled devices within each site. For example, a plurality of UEs 148A-1 through 148A-N are currently located at site 102A. Similarly, a plurality of UEs 148N-1 through 148N-N are currently located at site 102N. Each UE 148 may be any type of wireless client device, including, but not limited to, a mobile device such as a smart phone, tablet or laptop computer, a personal digital assistant (PDA), a wireless terminal, a smart watch, smart ring, or other wearable device. UEs 148 may also include wired client-side devices, e.g., IoT devices such as printers, security devices, environmental sensors, or any other device connected to the wired network and configured to communicate over one or more wireless networks 106.

In order to provide wireless network services to UEs 148 and/or communicate over the wireless networks 106, APs 142 and the other wired client-side devices at sites 102 are connected, either directly or indirectly, to one or more network devices (e.g., switches, routers, or the like) via physical cables, e.g., Ethernet cables. In the example of FIG. 1A, site 102A includes a switch 146A to which each of APs 142A-1 through 142A-M at site 102A are connected. Similarly, site 102N includes a switch 146N to which each of APs 142N-1 through 142N-M at site 102N are connected. Although illustrated in FIG. 1A as if each site 102 includes a single switch 146 and all APs 142 of the given site 102 are connected to the single switch 146, in other examples, each site 102 may include more or fewer switches and/or routers. In addition, the APs and the other wired client-side devices of the given site may be connected to two or more switches and/or routers. In addition, two or more switches at a site may be connected to each other and/or connected to two or more routers, e.g., via a mesh or partial mesh topology in a hub-and-spoke architecture. In some examples, interconnected switches and routers comprise wired local area networks (LANs) at sites 102 hosting wireless networks 106.

Example network system 100 also includes various networking components for providing networking services within the wired network including, as examples, an Authentication, Authorization and Accounting (AAA) server 110 for authenticating users and/or UEs 148, a Dynamic Host Configuration Protocol (DHCP) server 116 for dynamically assigning network addresses (e.g., IP addresses) to UEs 148 upon authentication, a Domain Name System (DNS) server 122 for resolving domain names into network addresses, a plurality of servers 128A-128X (collectively "servers 128") (e.g., web servers, databases servers, file servers and the like), and a network management system (NMS) 130. As shown in FIG. 1A, the various devices and systems of network 100 are coupled together via one or more network(s) 134, e.g., the Internet and/or an enterprise intranet.

In the example of FIG. 1A, NMS 130 is a cloud-based computing platform that manages wireless networks 106A-106N at one or more of sites 102A-102N. As further described herein, NMS 130 provides an integrated suite of management tools and implements various techniques of this disclosure. In general, NMS 130 may provide a cloud-based platform for network data acquisition, monitoring, activity logging, reporting, predictive analytics, network anomaly identification, and alert generation. In some examples, NMS 130 outputs notifications, such as alerts, alarms, graphical indicators on dashboards, log messages, text/SMS messages, email messages, and the like, and/or recommendations regarding network issues to a site or network administrator ("admin") interacting with and/or operating admin device 111. Additionally, in some examples, NMS 130 operates in response to configuration input received from the administrator interacting with and/or operating admin device 111.

The administrator and admin device 111 may comprise IT personnel and an administrator computing device associated with one or more of sites 102 and/or switches 146 at the wired network edge. Admin device 111 may be implemented as any suitable device for presenting output and/or accepting user input. For instance, admin device 111 may include a display. Admin device 111 may be a computing system, such as a mobile or non-mobile computing device operated by a user and/or by the administrator. Admin device 111 may, for example, represent a workstation, a laptop or notebook computer, a desktop computer, a tablet computer, or any other computing device that may be operated by a user and/or present a user interface in accordance with one or more aspects of the present disclosure. Admin device 111 may be physically separate from and/or in a different location than NMS 130 such that admin device 111 may communicate with NMS 130 via network 134 or other means of communication.

In some examples, one or more of the NAS devices, e.g., APs 142, switches 146, or routers, may connect to edge devices 150A-150N via physical cables, e.g., Ethernet cables. Edge devices 150 comprise cloud-managed, wireless local area network (LAN) controllers. Each of edge devices 150 may comprise an on-premises device at a site 102 that is in communication with NMS 130 to extend certain microservices from NMS 130 to the on-premises NAS devices while using NMS 130 and its distributed software architecture for scalable and resilient operations, management, troubleshooting, and analytics.

Each one of the network devices of network system 100, e.g., servers 110, 116, 122 and/or 128, APs 142, UEs 148, switches 146, and any other servers or devices attached to or forming part of network system 100, may include a system log or an error log module wherein each one of these network devices records the status of the network device including normal operational status and error conditions. Throughout this disclosure, one or more of the network devices of network system 100, e.g., servers 110, 116, 122 and/or 128, APs 142, UEs 148, and switches 146, may be considered "third-party" network devices when owned by and/or associated with a different entity than NMS 130 such that NMS 130 does not receive, collect, or otherwise have access to the recorded status and other data of the third-party network devices. In some examples, edge devices 150 may provide a proxy through which the recorded status and other data of the third-party network devices may be reported to NMS 130.

In some examples, NMS 130 monitors network data 137, e.g., one or more service level expectation (SLE) metrics, received from wireless networks 106A-106N at each site 102A-102N, respectively, and manages network resources, such as APs 142 at each site, to deliver a high-quality wireless experience to end users, IoT devices and clients at the site. For example, NMS 130 may include a virtual network assistant (VNA) 133 that implements an event processing platform for providing real-time insights and simplified troubleshooting for IT operations, and that automatically takes corrective action or provides recommendations to proactively address network issues. VNA 133 may, for example, include an event processing platform configured to process hundreds or thousands of concurrent streams of network data 137 from sensors and/or agents associated with APs 142 and/or nodes within network 134. For example, VNA 133 of NMS 130 may include an underlying analytics and network error identification engine and alerting system in accordance with various examples described herein. The underlying analytics engine of VNA 133 may apply historical data and models to the inbound event streams to compute assertions, such as identified anomalies or predicted occurrences of events constituting network error conditions. Further, VNA 133 may provide real-time alerting and reporting to notify a site or network administrator via admin device 111 of any predicted events, anomalies, trends, and may perform root cause analysis and automated or assisted error remediation. In some examples, VNA 133 of NMS 130 may apply machine learning techniques to identify the root cause of error conditions detected or predicted from the streams of network data 137. If the root cause may be automatically resolved, VNA 133 may invoke one or more corrective actions to correct the root cause of the error condition, thus automatically improving the underlying SLE metrics and also automatically improving the user experience.

Further example details of operations implemented by the VNA 133 of NMS 130 are described in U.S. Pat. No. 9,832,082, issued Nov. 28, 2017, and entitled "Monitoring Wireless Access Point Events," U.S. Publication No. US 2021/0306201, published Sep. 30, 2021, and entitled "Network System Fault Resolution Using a Machine Learning Model," U.S. Pat. No. 10,985,969, issued Apr. 20, 2021, and entitled "Systems and Methods for a Virtual Network Assistant," U.S. Pat. No. 10,958,585, issued Mar. 23, 2021, and entitled "Methods and Apparatus for Facilitating Fault Detection and/or Predictive Fault Detection," U.S. Pat. No. 10,958,537, issued Mar. 23, 2021, and entitled "Method for Spatio-Temporal Modeling," and U.S. Pat. No. 10,862,742, issued Dec. 8, 2020, and entitled "Method for Conveying AP Error Codes Over BLE Advertisements," all of which are incorporated herein by reference in their entirety.

In operation, NMS 130 may observe, collect and/or receive network data 137, which may take the form of data extracted from messages, counters, and statistics, for example. Network data 137 may include one or more of wireless data for a wireless deployment (e.g., wireless network 106A), wired data for a wired deployment (e.g., switch 146A), or a WAN deployment.

In accordance with one specific implementation, a computing device is part of NMS 130. In accordance with other implementations, NMS 130 may comprise one or more computing devices, dedicated servers, virtual machines, containers, services, or other forms of environments for performing the techniques described herein. Similarly, computational resources and components implementing VNA 133 may be part of the NMS 130, may execute on other servers or execution environments, or may be distributed to nodes within network 134 (e.g., routers, switches, controllers, gateways, and the like).

Some solutions to the identification of network issues occurring within a particular network site include identifying network issues related to client, connectivity, and device health for a single deployment type (e.g., a wireless deployment) of the particular network site. This may lead to a proactive identification and potential avoidance of issues for the single deployment type before they occur and/or improved resolution time of issues when they do occur at the single deployment type. However, such solutions do not similarly identify issues across multiple deployment types. For instance, an issue occurring within a wired or WAN deployment of a site may also cause issues within the wireless deployment of the site that may be difficult or even undetectable using only wireless data collected from network devices within the wireless deployment. As such, an administrator or other user may need to manually identify issues across multiple deployment types, e.g., by making separate queries to distinct troubleshooting engines for each deployment type at the site.

For example, a wireless troubleshooting engines may troubleshoot wireless issues but may not provide a useful root cause of the issues based only on wireless data. As noted above, issues in the wireless deployment may be caused by wired or WAN issues. By troubleshooting WAN, wireless, and wired together, site troubleshooting engine 135 may identify a root cause for all deployment types. Further, site troubleshooting engine 135 may recommend an action to quickly resolve the issue(s).

Techniques described herein may include site troubleshooting engine 135 identifying network issues occurring within a particular network site and generating a summary indicating what the issues are for each of WAN, wired, and wireless deployments of the particular network site. For each type of deployment, the summary may indicate a respective set of issues. For example, for a wireless deployment, the set of one or more issues may include being unable to connect and being connected but slow. Issues for being unable to connect in a wireless deployment may include one or more of authentication failures or access point disconnects. Issues for being connected but slow in a wireless deployment may include one or more of poor coverage or a low capacity at the access point. Similarly, for a wired deployment, the set of one or more issues may include being unable to connect and being connected but slow. Issues for being unable to connect in a wired deployment may include one or more of authentication failures or access point disconnects. Issues for being connected but slow in a wired deployment may include one or more of poor coverage or a low capacity at the access point.

For each deployment type (e.g., wireless, wired, and/or WAN deployments) of a given site, site troubleshooting engine 135 may classify each issue into client, connectivity, and device health (i.e., three troubleshooting categories). For each troubleshooting category, site troubleshooting engine 135 may use a SLE score as the primary indicator to rank a top issue. As discussed further below, site troubleshooting engine 135 may rank the issues across troubleshooting categories for each deployment and/or rank the top issues in the deployments. As shown in Table 1, site troubleshooting engine 135 may only report the top issues in each category. In some examples, conversational assistant engine 136 may display Table 1 in the conversational assistant and/or a dashboard for the conversational assistant.

TABLE 1

| SITE A ISSUES | | | |
|---|---|---|---|
| | WAN | WIRED | WIRELESS |
| CLIENT | loss of Internet connectivity | slow performance | authentication failures |
| CONNECTIVITY | authentication failures | slow performance | poor coverage |
| DEVICE HEALTH | disconnects | slow performance | AP disconnects |

Site troubleshooting engine 135 may provide a user the capability to drill down into each category's top issue to provide more details (e.g., a reason for failure, a percentage of clients impacted, a scope of impact) for each of the failures indicated in the summary. In some examples, site troubleshooting engine 135 may include only one redirection link to the respective SLE of that category. If the site has WAN deployment, site troubleshooting engine 135 may include an application category as shown in Table 2. The application category may identify a cause of application issues. In some examples, conversational assistant engine 136 may display Table 2 in the conversational assistant and/or a dashboard for the conversational assistant.

TABLE 2

| SITE B ISSUES | | | |
|---|---|---|---|
| | WAN | WIRED | WIRELESS |
| CLIENT | loss of Internet connectivity | slow performance | authentication failures |
| CONNECTIVITY | authentication failures | slow performance | poor coverage |
| DEVICE HEALTH | disconnects | slow performance | AP disconnects |
| Application | Application issue | — | — |

Site troubleshooting engine 135 may determine that the application issue is a top issue for the WAN deployment. For instance, site troubleshooting engine 135 may be pre-configured to rank the application issue in the application category higher than all issues in the client, connectivity, and device health categories. In this example, site troubleshooting engine 135 may rank the slow performance in the connectivity category for the wired deployment as a highest issue for the wired deployment. For instance, site troubleshooting engine 135 may be pre-configured to rank, for the WAN and wireless deployments, an issue in the connectivity category higher than all issues in the client and device health categories in response to identifying an application issue in the WAN deployment. In some instances, site troubleshooting engine 135 may be configured to rank the slow performance issue in the connectivity category of the wired deployment higher than issues in the client and device health categories in response to determining the slow performance issue in the connectivity category has a highest SLE score.

In this example, conversational assistant engine 136 may display the application issue for the WAN deployment, the slow performance in the connectivity category for the wired deployment, and the slow performance in the connectivity category for the wireless deployment. In this example, conversational assistant engine 136 may refrain from displaying the issues in one or more of the client category or the device health category. For instance, conversational assistant engine 136 may refrain from displaying issues that site troubleshooting engine 135 does not identify as a highest issue for the deployment.

After the troubleshoot categories, conversational assistant engine 136 may display text indicating if there are any pending actions for the site. Examples of pending actions may include recommended actions that have been identified but not been performed. If there are any pending actions for the site, conversational assistant engine 136 may indicate how many actions are pending for the site along with the redirection link to the site view of actions as well as newly recommended actions. Table 3 illustrates an example of actions that may be displayed.

TABLE 3

| SITE C ISSUES | | | |
|---|---|---|---|
| | WAN | WIRED | WIRELESS |
| CLIENT | loss of Internet connectivity<br>Pending Action A | slow performance<br>Pending Action B | authentication failures<br>Pending Action C |
| CONNECTIVITY | authentication failures<br>Pending Action D | slow performance<br>Pending Action E | poor coverage<br>Pending Action F |
| DEVICE HEALTH | Disconnects<br>Pending Action G | slow performance<br>Pending Action H | AP disconnects<br>Pending Action I |
| Application | Application issue<br>Pending Action J | — | — |

For example, site troubleshooting engine 135 may perform a root cause analysis for authentication failures in the client category for the wireless deployment. In this example, site troubleshooting engine 135 may identify pending action C. Conversational assistant engine 136 may display text indicating if there is a pending action C for site C, for example, in the conversational assistant.

In some examples, the site or network administrator, e.g., using admin device 111, may initiate the troubleshooting of the particular site via a conversational assistant engine 136 of VNA 133. Conversational assistant engine 136 may be configured to process user inputs, such as text strings, and generate responses. In some examples, conversational assistant engine 136 may include one or more natural language processors configured to process the user inputs. Conversational assistant engine 136 may be configured to conduct a chat conversation that simulates a way a human would behave as a conversation partner, which may help to simplify and/or improve a satisfaction of an administrator monitoring and controlling a network.

In accordance with one or more techniques of the disclosure, conversational assistant engine 136 may generate a conversational assistant configured to receive user input. In a specific use case, the admin, via admin device 111, may enter a query for a particular site into conversational assistant engine 136. Conversational assistant engine 136 may provide a platform in which to present the troubleshooting issues to the administrator via admin device 111.

For instance, the conversational assistant may receive a string indicating the site (e.g., "troubleshoot Mist Office," where "Mist Office" indicates the site. Conversational assistant engine 136 may determine the particular network devices of the site and deployments based on the user input, and determine one or more troubleshooting issues at the site. Upon identifying the particular site, site troubleshooting engine 135 may identify troubleshooting issues at various deployments at the site based on data collect from network devices within the various deployments, which may be retrieved from temporal graph database 138. Site troubleshooting engine 135 may generate data representative of the troubleshooting issues for presentation within the conversational assistant to the administrator using admin device 111. The visualization includes color-coding, icons, or other indicia of troubleshooting issues at deployments of the site, as determined by site troubleshooting engine 135 based on the temporal data stored as network data 137 and/or temporal graph database 138. In this example, the administrator using admin device 111 may interact with the troubleshooting issues presented within the conversational assistant to select a troubleshooting issue. In response to the selection of the troubleshooting issue, site troubleshooting engine 135 may further generate a troubleshooting user interface for the troubleshooting issue for presentation within the conversational assistant. Additionally, or alternatively, site troubleshooting engine 135 may redirect the user to a customer insight or recommended action user interface specific to the network device. Additional information with respect to the conversational assistant is described in U.S. patent application Ser. No. 17/647,954, filed Jan. 13, 2022, entitled "CONVERSATIONAL ASSISTANT FOR OBTAINING NETWORK INFORMATION," the entire content of which is incorporated herein by reference in its entirety.

The techniques of this disclosure provide one or more technical advantages and practical applications. For example, the techniques enable troubleshooting of a site by identifying network issues at each deployment. For example, site troubleshooting engine 135 may access not only wireless data to determine issues at a site, but may further access wired data and/or WAN data. In this way, site troubleshooting engine 135 may determine wired issues and/or WAN issues, which may help to reduce an amount of time an administrator spends troubleshooting a site. Moreover, troubleshooting WAN, wireless, and wired deployments together, site troubleshooting engine 135 may identify a root cause for all deployment types more quickly compared to systems that identify a root cause using only data from a wireless deployment. Moreover, site troubleshooting engine 135 may recommend an action in the conversational assistant to quickly resolve the issue(s).

Although the techniques of the present disclosure are described in this example as performed by NMS 130, techniques described herein may be performed by any other computing device(s), system(s), and/or server(s), and that the disclosure is not limited in this respect. For example, one or more computing device(s) configured to execute the functionality of the techniques of this disclosure may reside in a dedicated server or be included in any other server in addition to or other than NMS 130, or may be distributed throughout network 100, and may or may not form a part of NMS 130.

Figure 1B:
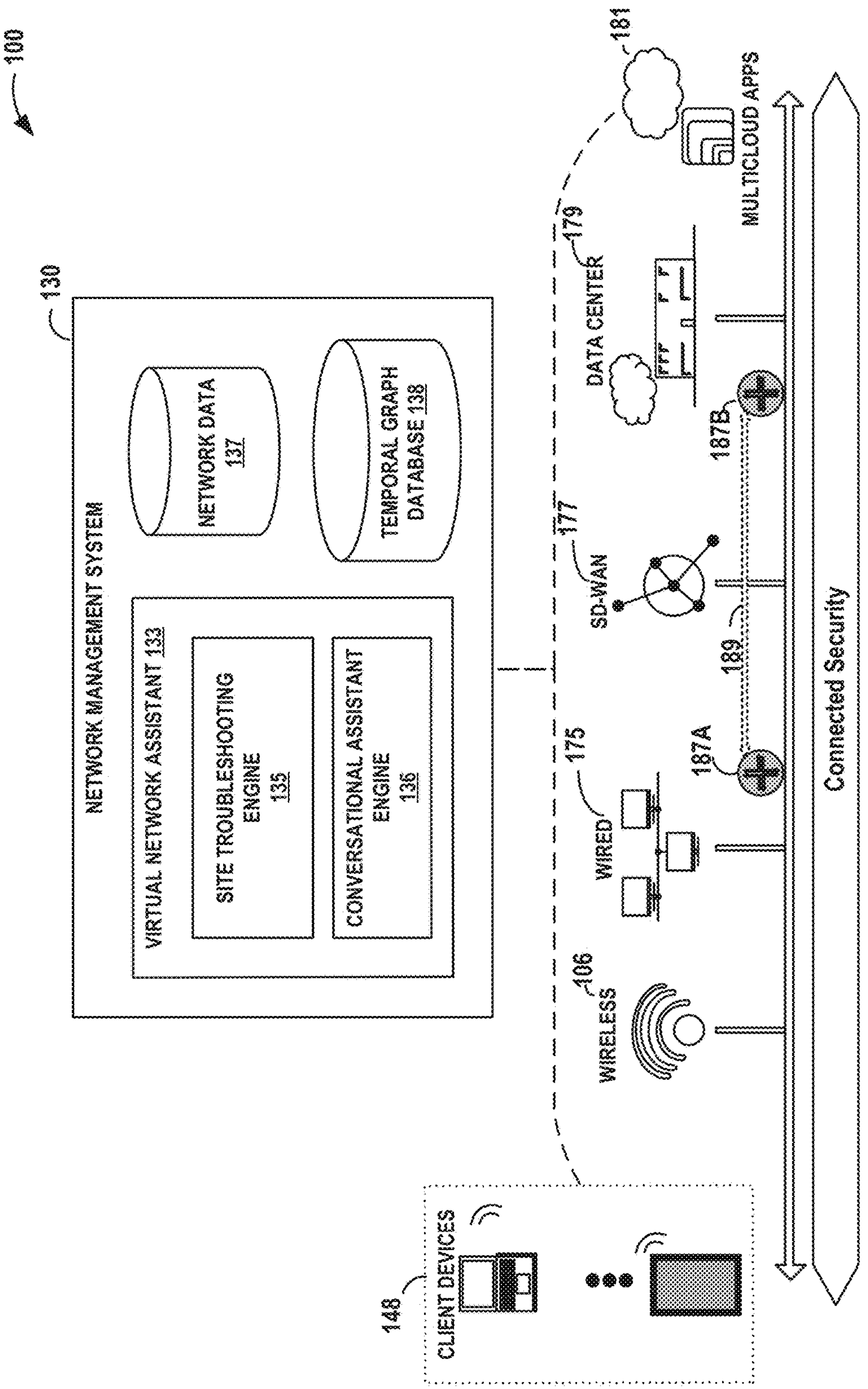
FIG. 1B is a block diagram illustrating further example details of the network system of FIG. 1A.

FIG. 1B is a block diagram illustrating further example details of the network system of FIG. 1A. In this example, FIG. 1B illustrates NMS 130 configured to operate according to an artificial intelligence and/or machine-learning-based computing platform providing comprehensive automation, insight, and assurance (Wi-Fi Assurance, Wired Assurance and WAN assurance).

As described herein, NMS 130 may provide an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. For example, network management system 130 may be configured to proactively monitor and adaptively configure network 100 so as to provide self-driving capabilities. Moreover, VNA 133 may include a natural language processing engine to provide AI-driven support and troubleshooting, anomaly detection, AI-driven location services, and AI-driven radio frequency (RF) optimization with reinforcement learning.

As illustrated in the example of FIG. 1B, AI-driven NMS 130 may provide configuration management, monitoring and automated oversight of software defined wide-area network (SD-WAN) 177, which operates as an intermediate network communicatively coupling wireless networks 106 and wired LANs 175 to data centers 179 and application services (e.g., multicloud apps) 181. In general, SD-WAN 177 provides seamless, secure, traffic-engineered connectivity between "spoke" routers 187A of edge wired networks 175 hosting wireless networks 106, such as branch or campus networks, to "hub" routers 187B further up the cloud stack toward cloud-based application services 181. SD-WAN 177 often operates and manages an overlay network on an underlying physical Wide-Area Network (WAN), which provides connectivity to geographically separate customer networks. In other words, SD-WAN 177 may extend Software-Defined Networking (SDN) capabilities to a WAN and allows network(s) to decouple underlying physical network infrastructure from virtualized network infrastructure and applications such that the networks may be configured and managed in a flexible and scalable manner.

In some examples, underlying routers of SD-WAN 177 may implement a stateful, session-based routing scheme in which the routers 187A, 187B dynamically modify contents of original packet headers sourced by client devices 148 to steer traffic along selected paths, e.g., path 189, toward application services 181 without requiring use of tunnels and/or additional labels. In this way, routers 187A, 187B may be more efficient and scalable for large networks since the use of tunnel-less, session-based routing may enable routers 187A, 187B to achieve considerable network resources by obviating the need to perform encapsulation and decapsulation at tunnel endpoints. Moreover, in some examples, each router 187A, 187B may independently perform path selection and traffic engineering to control packet flows associated with each session without requiring use of a centralized SDN controller for path selection and label distribution. In some examples, routers 187A, 187B implement session-based routing as Secure Vector Routing (SVR), provided by Juniper Networks, Inc.

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; U.S. Pat. No. 10,432,522, entitled "NETWORK PACKET FLOW CONTROLLER WITH EXTENDED SESSION MANAGEMENT," and issued on Oct. 1, 2019; and U.S. Pat. No. 11,075,824, entitled "IN-LINE PERFORMANCE MONITORING," and issued on Jul. 27, 2021, the entire content of each of which is incorporated herein by reference in its entirety.

In some examples, AI-driven NMS 130 may enable intent-based configuration and management of network system 100, including enabling construction, presentation, and execution of intent-driven workflows for configuring and managing devices associated with wireless networks 106, wired LAN networks 175, and/or SD-WAN 177. For example, declarative requirements express a desired configuration of network components without specifying an exact native device configuration and control flow. By utilizing declarative requirements, what should be accomplished may be specified rather than how it should be accomplished. Declarative requirements may be contrasted with imperative instructions that describe the exact device configuration syntax and control flow to achieve the configuration. By utilizing declarative requirements rather than imperative instructions, a user and/or user system is relieved of the burden of determining the exact device configurations required to achieve a desired result of the user/system. For example, it is often difficult and burdensome to specify and manage exact imperative instructions to configure each device of a network when various different types of devices from different vendors are utilized. The types and kinds of devices of the network may dynamically change as new devices are added and device failures occur. Managing various different types of devices from different vendors with different configuration protocols, syntax, and software versions to configure a cohesive network of devices is often difficult to achieve. Thus, by only requiring a user/system to specify declarative requirements that specify a desired result applicable across various different types of devices, management and configuration of the network devices becomes more efficient. Further example details and techniques of an intent-based network management system are described in U.S. Pat. No. 10,756,983, entitled "Intent-based Analytics," and U.S. Pat. No. 10,992,543, entitled "Automatically generating an intent-based network model of an existing computer network," each of which is hereby incorporated by reference.

In accordance with the techniques described in this disclosure, for a particular application session, site troubleshooting engine 135 of VNA 133 may receive a query identifying a site (e.g., site 102A) of the plurality of sites (e.g., plurality of sites 102A-102N). For example, a human administrator may input a query using admin device 111. In this example, site troubleshooting engine 135 of VNA 133 may determine, based on data received from network devices of network system 100 and stored at network data 137, a first set of troubleshooting issues for a SD-WAN 177 at the site, a second set of troubleshooting issues for one or more wireless LANs 106 at the site, and a third set of troubleshooting issues for wired LAN 175 at the site. For instance, site troubleshooting engine 135 of VNA 133 may determine one or more of a client issue, a connectivity issue, or a device health issue for the WAN deployment. Similarly, site troubleshooting engine 135 of VNA 133 may determine one or more of one or more of a client issue, a connectivity issue, or a device health issue for the wireless deployment and/or the wired deployment.

Site troubleshooting engine 135 of VNA 133 may determine, based on a user experience metric, a first troubleshooting issue from the first set of troubleshooting issues for the WAN deployment, a second troubleshooting issue from the second set of troubleshooting issues for the wireless deployment, and a third troubleshooting issue from the third set of troubleshooting issues for the wired deployment. For instance, site troubleshooting engine 135 of VNA 133 may determine, based on the user experience metric (e.g., SLE score values), that the first troubleshooting issue has a highest impact (e.g., a highest SLE score value) to a user experience of the first set of troubleshooting issues for the WAN deployment. Similarly, site troubleshooting engine 135 of VNA 133 may determine, based on the user experience metric, that the second troubleshooting issue has a highest impact to a user experience of the second set of troubleshooting issues for the wireless deployment and/or determine, based on the user experience metric, that the third troubleshooting issue has a highest impact to a user experience of the third set of troubleshooting issues for the wired deployment.

Conversational assistant engine 136 may generate data representative of a user interface for presentation on administrator device 111, the user interface including a visualization of at least the first troubleshooting issue, the second troubleshooting issue, and the third troubleshooting issue. For instance, conversational assistant engine 136 may generate data representative of the user interface illustrated in FIG. 6.

The disclosed techniques enable troubleshooting of a site by identifying network issues at each deployment. For example, site troubleshooting engine 135 of VNA 133 may access not only wireless data to determine issues at a site, but may further access wired data and/or WAN data. In this way, site troubleshooting engine 135 of VNA 133 may determine wired issues and/or WAN issues, which may help to reduce an amount of time an administrator spends troubleshooting a site. Moreover, troubleshooting WAN, wireless, and wired deployments together, may help site troubleshooting engine 135 of VNA 133 identify a root cause for all deployment types more quickly compared to systems that identify a root cause using only data from a wireless deployment. Moreover, site troubleshooting engine 135 of VNA 133 may recommend an action in the conversational assistant to quickly resolve the issue(s).

Figure 2:
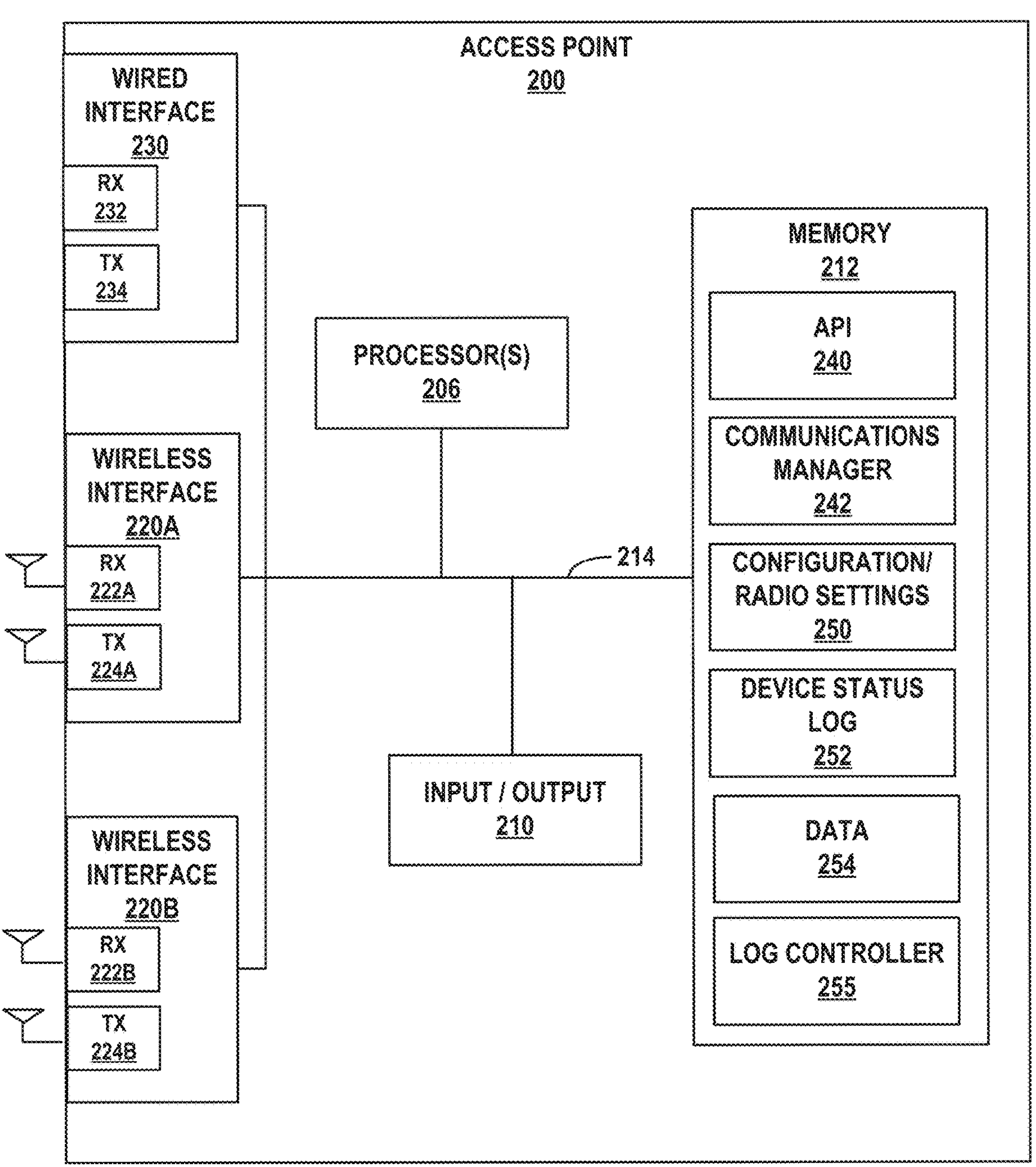
FIG. 2 is a block diagram of an example access point device, in accordance with one or more techniques of this disclosure.

FIG. 2 is a block diagram of an example access point (AP) device 200 configured in accordance with one or more techniques of this disclosure. Example access point 200 shown in FIG. 2 may be used to implement any of APs 142 as shown and described herein with respect to FIG. 1A. Access point 200 may comprise, for example, a Wi-Fi, Bluetooth and/or Bluetooth Low Energy (BLE) base station or any other type of wireless access point.

In the example of FIG. 2, access point 200 includes a wired interface 230, wireless interfaces 220A-220B one or more processor(s) 206, memory 212, and input/output 210, coupled together via a bus 214 over which the various elements may exchange data and information. Wired interface 230 represents a physical network interface and includes a receiver 232 and a transmitter 234 for sending and receiving network communications, e.g., packets. Wired interface 230 couples, either directly or indirectly, access point 200 to a wired network device, such as one of switches 146 of FIG. 1A, within the wired network via a cable, such as an Ethernet cable.

First and second wireless interfaces 220A and 220B represent wireless network interfaces and include receivers 222A and 222B, respectively, each including a receive antenna via which access point 200 may receive wireless signals from wireless communications devices, such as UEs 148 of FIG. 1A. First and second wireless interfaces 220A and 220B further include transmitters 224A and 224B, respectively, each including transmit antennas via which access point 200 may transmit wireless signals to wireless communications devices, such as UEs 148 of FIG. 1A. In some examples, first wireless interface 220A may include a Wi-Fi 802.11 interface (e.g., 2.4 GHz and/or 5 GHz) and second wireless interface 220B may include a Bluetooth interface and/or a Bluetooth Low Energy (BLE) interface.

Processor(s) 206 are programmable hardware-based processors configured to execute software instructions, such as those used to define a software or computer program, stored to a computer-readable storage medium (such as memory 212), such as non-transitory computer-readable mediums including a storage device (e.g., a disk drive, or an optical drive) or a memory (such as Flash memory or RAM) or any other type of volatile or non-volatile memory, that stores instructions to cause the one or more processors 206 to perform the techniques described herein.

Memory 212 includes one or more devices configured to store programming modules and/or data associated with operation of access point 200. For example, memory 212 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 206 to perform the techniques described herein.

In this example, memory 212 stores executable software including an application programming interface (API) 240, a communications manager 242, configuration/radio settings 250, a device status log 252 and data 254. Device status log 252 includes a list of events specific to access point 200. The events may include a log of both normal events and error events such as, for example, memory status, reboot or restart events, crash events, cloud disconnect with self-recovery events, low link speed or link speed flapping events, Ethernet port status, Ethernet interface packet errors, upgrade failure events, firmware upgrade events, configuration changes, etc., as well as a time and date stamp for each event. Log controller 255 determines a logging level for the device based on instructions from NMS 130. Data 254 may store any data used and/or generated by access point 200, including data collected from UEs 148, such as data used to calculate one or more SLE metrics, that is transmitted by access point 200 for cloud-based management of wireless networks 106A by NMS 130.

Input/output (I/O) 210 represents physical hardware components that enable interaction with a user, such as buttons, a display, and the like. Although not shown, memory 212 typically stores executable software for controlling a user interface with respect to input received via I/O 210. Communications manager 242 includes program code that, when executed by processor(s) 206, allow access point 200 to communicate with UEs 148 and/or network(s) 134 via any of interface(s) 230 and/or 220A-220C. Configuration settings 250 include any device settings for access point 200 such as radio settings for each of wireless interface(s) 220A-220C. These settings may be configured manually or may be remotely monitored and managed by NMS 130 to optimize wireless network performance on a periodic (e.g., hourly or daily) basis.

As described herein, AP device 200 may measure and report network data from status log 252 to NMS 130. The network data may comprise event data, telemetry data, and/or other SLE-related data. The network data may include various parameters indicative of the performance and/or status of the wireless network. The parameters may be measured and/or determined by one or more of the UE devices and/or by one or more of the APs in a wireless network. NMS 130 may determine one or more SLE metrics based on the SLE-related data received from the APs in the wireless network and store the SLE metrics as network data 137 (FIG. 1A). NMS 130 may further update temporal graph database 138 (FIG. 1A) of the network to include the telemetry data, or at least entity and connectivity information extracted from the telemetry data, received from the APs in the wireless network over time.

Figure 3:
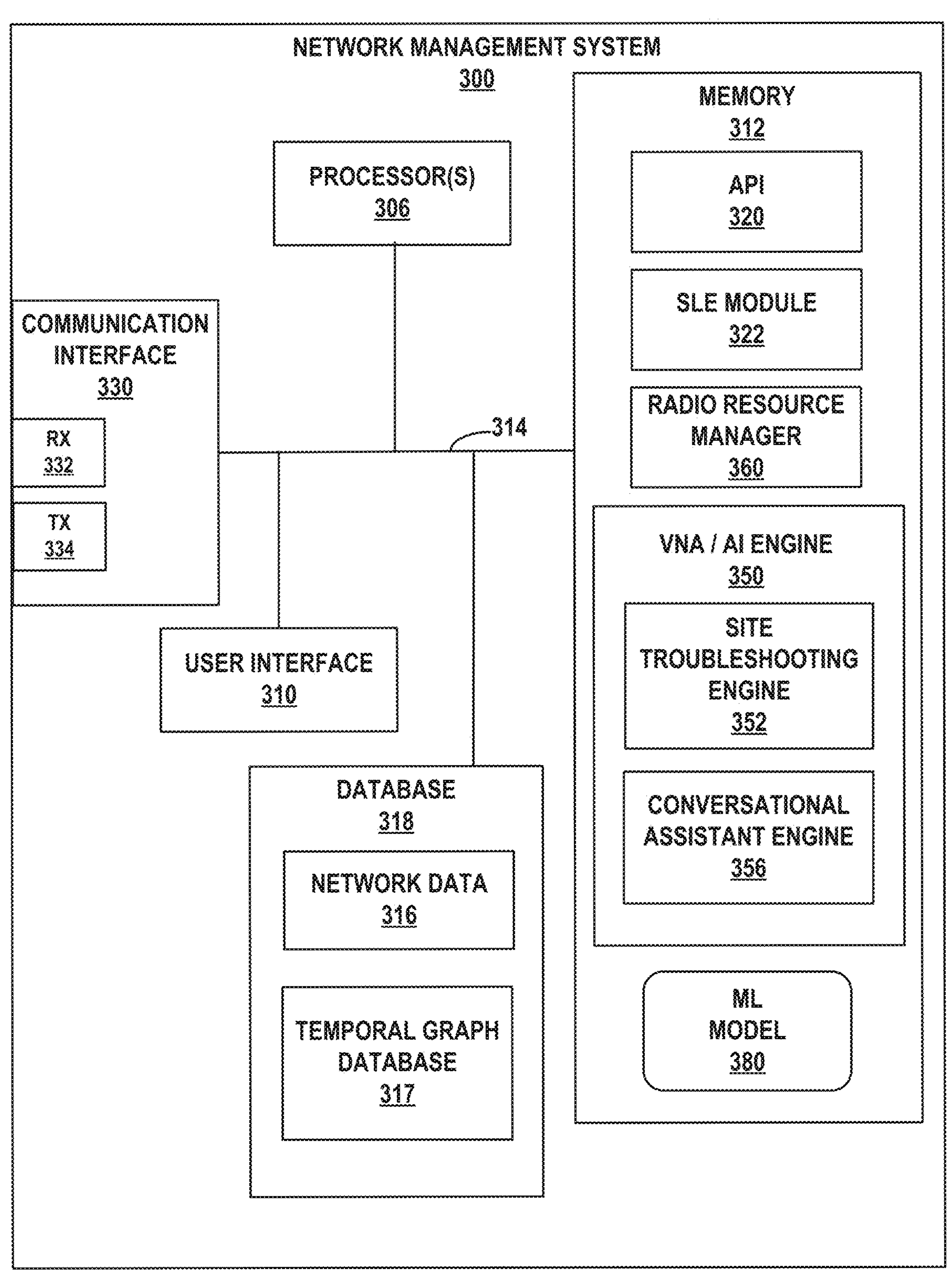
FIG. 3 is a block diagram of an example network management system configured to provide troubleshooting for a site, in accordance with one or more techniques of the disclosure.

FIG. 3 is a block diagram of an example network management system (NMS) 300 configured to provide troubleshooting for a site, in accordance with one or more techniques of the disclosure. NMS 300 may be used to implement, for example, NMS 130 in FIGS. 1A-1B. In such examples, NMS 300 is responsible for monitoring and management of one or more wireless networks 106A-106N at sites 102A-102N, respectively.

NMS 300 includes a communications interface 330, one or more processor(s) 306, a user interface 310, a memory 312, and a database 318. The various elements are coupled together via a bus 314 over which the various elements may exchange data and information. In some examples, NMS 300 receives data from one or more of client devices 148, APs 142, switches 146 and other network nodes within network 134, e.g., routers 187 of FIG. 1B, which may be used to calculate one or more SLE metrics and/or update temporal graph database 317. NMS 300 analyzes this data for cloud-based management of wireless networks 106A-106N. The received data is stored as network data 316 in database 318, and the telemetry data included in the received data, or at least entity and connectivity information extracted from the telemetry data, is stored within temporal graph database 317 in database 318. In some examples, NMS 300 may be part of another server shown in FIG. 1A or a part of any other server.

Processor(s) 306 execute software instructions, such as those used to define a software or computer program, stored to a computer-readable storage medium (such as memory 312), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 330 may include, for example, an Ethernet interface.

Communications interface 330 couples NMS 300 to a network and/or the Internet, such as any of network(s) 134 as shown in FIG. 1A, and/or any local area networks. Communications interface 330 includes a receiver 332 and a transmitter 334 by which NMS 300 receives/transmits data and information to/from any of client devices 148, APs 142, switches 146, servers 110, 116, 122, 128 and/or any other network nodes, devices, or systems forming part of network system 100 such as shown in FIG. 1A. In some scenarios described herein in which network system 100 includes "third-party" network devices that are owned and/or associated with different entities than NMS 300, NMS 300 does not receive, collect, or otherwise have access to network data from the third-party network devices.

The data and information received by NMS 300 may include, for example, telemetry data, SLE-related data, or event data received from one or more of client device APs 148, APs 142, switches 146, or other network nodes, e.g., routers 187 of FIG. 1B, used by NMS 300 to remotely monitor the performance of wireless networks 106A-106N and application sessions from client device to cloud-based application server. NMS 300 may further transmit data via communications interface 330 to any of network devices such as client devices 148, APs 142, switches 146, other network nodes within network 134, admin device 111 to remotely manage wireless networks 106A-106N and portions of the wired network.

Memory 312 includes one or more devices configured to store programming modules and/or data associated with operation of NMS 300. For example, memory 312 may include a computer-readable storage medium, such as a non-transitory computer-readable medium including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In this example, memory 312 includes an API 320, an SLE module 322, a virtual network assistant (VNA)/AI engine 350, and a radio resource manager (RRM) 360. In accordance with the disclosed techniques, VNA/AI engine 350 includes site troubleshooting engine 352 that builds an application-session specific topology for a particular application session based on data for the particular application session retrieved from temporal graph database 317. Site troubleshooting engine 352, in some examples, applies a ML model 380 to network data 316 and/or temporal graph database 317 to perform troubleshooting of the particular application session by identifying root causes of network issues at one or more of the subset of network devices involved in the particular application session. NMS 300 may also include any other programmed modules, software engines and/or interfaces configured for remote monitoring and management of wireless networks 106A-106N and portions of the wired network, including remote monitoring and management of any of APs 142/200, switches 146, or other network devices, e.g., routers 187 of FIG. 1B.

SLE module 322 enables set up and tracking of thresholds for SLE metrics for each network 106A-106N. SLE module 322 further analyzes SLE-related data collected by APs, such as any of APs 142 from UEs in each wireless network 106A-106N. For example, APs 142A-1 through 142A-N collect SLE-related data from UEs 148A-1 through 148A-N currently connected to wireless network 106A. This data is transmitted to NMS 300, which executes by SLE module 322 to determine one or more SLE metrics for each UE 148A-1 through 148A-N currently connected to wireless network 106A. This data, in addition to any network data collected by one or more APs 142A-1 through 142A-N in wireless network 106A, is transmitted to NMS 300 and stored as, for example, network data 316 in database 318.

RRM engine 360 monitors one or more metrics for each site 102A-102N in order to learn and optimize the RF environment at each site. For example, RRM engine 360 may monitor the coverage and capacity SLE metrics for a wireless network 106 at a site 102 in order to identify potential issues with SLE coverage and/or capacity in the wireless network 106 and to make adjustments to the radio settings of the access points at each site to address the identified issues. For example, RRM engine 360 may determine channel and transmit power distribution across all APs 142 in each network 106A-106N. For example, RRM engine 360 may monitor events, power, channel, bandwidth, and number of clients connected to each AP. RRM engine 360 may further automatically change or update configurations of one or more APs 142 at a site 102 with an aim to improve the coverage and capacity SLE metrics and thus to provide an improved wireless experience for the user.

VNA/AI engine 350 analyzes data received from network devices as well as its own data to identify when undesired or abnormal states are encountered at one of the network devices. For example, VNA/AI engine 350 may identify the root cause of any undesired or abnormal states, e.g., any poor SLE metric(s) indicative of connected issues at one or more network devices. In addition, VNA/AI engine 350 may automatically invoke one or more corrective actions intended to address the identified root cause(s) of one or more poor SLE metrics. Examples of corrective actions that may be automatically invoked by VNA/AI engine 350 may include, but are not limited to, invoking RRM 360 to reboot one or more APs, adjusting/modifying the transmit power of a specific radio in a specific AP, adding SSID configuration to a specific AP, changing channels on an AP or a set of APs, etc. The corrective actions may further include restarting a switch and/or a router, invoking downloading of new software to an AP, switch, or router, etc. These corrective actions are given for example purposes only, and the disclosure is not limited in this respect. If automatic corrective actions are not available or do not adequately resolve the root cause, VNA/AI engine 350 may proactively provide a notification including recommended corrective actions to be taken by IT personnel, e.g., a site or network administrator using admin device 111, to address the network error.

In accordance with one or more techniques of this disclosure, VNA/AI engine 350 may be configured to identify troubleshooting issues for multiple deployments at a site. For a particular site, site troubleshooting engine 352 may identify troubleshooting issues for each of a plurality of deployments (e.g., two or more of a WAN deployment, a wireless deployment, or a wired deployment). VNA/AI engine 350 may determine the troubleshooting issues based on network data received from the network devices, e.g., client devices 148, AP devices 142, switches 146, and other network nodes such as routers 187 of FIG. 1B. Site troubleshooting engine 352 may enable visualization of the troubleshooting issues including color-coding, icons, or other indicia of the troubleshooting issues at the site.

Temporal graph database 317 is configured to store connectivity and entity information of the network, which is extracted from historical telemetry data that NMS 300 collects from client devices 148, APs 142, switches 146, and/or other network nodes within network 134. The connectivity information may represent different kinds of connections, including wireless, wired, and logical links such as peer paths or IPsec tunnels for SD-WAN devices, e.g., routers 187 of SD-WAN 177 from FIG. 1B. The entity information may represent different kinds of network devices, including client devices, AP devices, switches, other network nodes such as routes and gateways, and third-party network devices as well as applications running on the network devices. NMS 300 uses the connectivity and entity information to update temporal graph database 317, where the graph is representative of the network topology.

Site troubleshooting engine 352 may analyze network data 316 of the subset of network devices involved with the troubleshooting issues to identify root causes of the troubleshooting issues at the site. More specifically, site troubleshooting engine 352 may analyze event data included in or derived from network device 316 to determine whether further network issues are present. In some scenarios, site troubleshooting engine 352 may apply at least a portion of network data 316 to ML model 380 to determine root causes of the troubleshooting issues.

Site troubleshooting engine 352 may use different data for each of the different deployments deployed at the site to identify network issues and/or root causes of the network issues. For example, site troubleshooting engine 352 may analyze event data and/or telemetry data to identify troubleshooting issues based on one or more of data for a wired deployment, data for a wireless deployment, or data for a WAN deployment. Site troubleshooting engine 352 may analyze AP health, radio health, pre-connection issues, RF issues, and/or configuration issues to identify network issues caused by an access point 142/200. Site troubleshooting engine 352 may analyze switch health, cable issues, missing virtual local area network (VLAN), congestion and/or configuration issues to identify network issues caused by a switch 146. Site troubleshooting engine 352 may analyze gateway health, WAN link, and/or configuration issues to identify network issues caused by routers or gateways 187A, 187B of SD-WAN 177.

Site troubleshooting engine 352 may generate data representative of a user interface to provide to a user, e.g., a site or network administrator using admin device 111, including color-coding, icons, or other indicia of troubleshooting issues at the site. In response to user input selecting an icon indicative of troubleshooting issue, site troubleshooting engine 352 may further generate a troubleshooting user interface for the troubleshooting issue or may redirect the user to a customer insight or recommended action.

In some examples, ML model 380 may comprise a supervised ML model that is trained, using training data comprising pre-collected, labeled network data received from network devices (e.g., client devices, APs, switches and/or other network nodes), to identify root causes of troubleshooting issues at one or more deployments at the site. The supervised ML model may comprise one of a logistical regression, naïve Bayesian, support vector machine (SVM), or the like. In other examples, ML model 380 may comprise an unsupervised ML model. Although not shown in FIG. 3, in some examples, database 318 may store the training data and VNA/AI engine 350 or a dedicated training module may be configured to train ML model 380 based on the training data to determine appropriate weights across the one or more features of the training data.

In the case of a troubleshooting issue being detected at the site, site troubleshooting engine 352 generates data representative of a user interface to provide to a user, e.g., a site or network administrator using admin device 111, visualization of the troubleshooting issue including color-coding, icons, or other indicia of the troubleshooting issue. In some examples, VNA/AI engine 350 may determine a recommended action based on the detected troubleshooting issue and/or a root cause determined for the detected troubleshooting issue. VNA/AI engine 350 may output a notification of the troubleshooting issue and/or the root cause of the troubleshooting issue via one or more of user interface 310, API 320, webhooks, or email via communication interface 330 for display on admin device 111 of the administrator.

In some examples, the site or network administrator, e.g., using admin device 111, may initiate the troubleshooting of the site via a conversational assistant engine 356. Conversational assistant engine 356 may be configured to process user inputs, such as text strings, and generate responses. In some examples, conversational assistant engine 356 may include one or more natural language processors configured to process the user inputs. Conversational assistant engine 356 may be configured to conduct a chat conversation that simulates a way a human would behave as a conversation partner, which may help to simplify and/or improve a satisfaction of an administrator monitoring and controlling a network.

In accordance with one or more techniques of the disclosure, conversational assistant engine 356 may generate a conversational assistant configured to receive user input. In a specific use case, the admin, via admin device 111, may enter a query for a particular network device and/or a particular application session into conversational assistant engine 356.

For instance, a conversational assistant may receive a string indicating the site (e.g., "troubleshoot Mist Office," where "Mist Office" indicates the site). Conversational assistant engine 356 may determine the particular network devices of the site and deployments based on the user input, and determine one or more troubleshooting issues at the site. Upon identifying the particular site, site troubleshooting engine 352 may identify troubleshooting issues at various deployments at the site based on data for the particular application session retrieved from temporal graph database 317. Site troubleshooting engine 352 may generate data representative of the troubleshooting issues for presentation within the conversational assistant. The visualization may include color-coding, icons, or other indicia of troubleshooting issues at deployments of the site, as determined by site troubleshooting engine 352 based on the temporal data stored as network data 316 and/or temporal graph database 317. In this example, the administrator using admin device 111 may interact with the troubleshooting issues presented within the conversational assistant to select a troubleshooting issue. In response to the selection of the troubleshooting issue, conversational assistant engine 356 may further generate a troubleshooting user interface for the troubleshooting issue for presentation within the conversational assistant. Additionally, or alternatively, conversational assistant engine 356 may redirect the user to a customer insight or recommended action user interface specific to the network device.

The techniques of this disclosure provide one or more technical advantages and practical applications. For example, the techniques enable troubleshooting of a site by identifying connectivity issues at each deployment. For example, site troubleshooting engine 352 may access not only wireless data to determine issues at a site, but may further access wired data and/or WAN data. In this way, site troubleshooting engine 352 may determine wired issues and/or WAN issues, which may help to reduce an amount of time an administrator spends troubleshooting a site. Moreover, troubleshooting WAN, wireless, and wired deployments together, site troubleshooting engine 352 may identify a root cause for all deployment types more quickly compared to systems that identify a root cause using only data from a wireless deployment. Moreover, site troubleshooting engine 135 may recommend an action in the conversational assistant to quickly resolve the issue(s).

Although the techniques of the present disclosure are described in this example as performed by NMS 130, techniques described herein may be performed by any other computing device(s), system(s), and/or server(s), and that the disclosure is not limited in this respect. For example, one or more computing device(s) configured to execute the functionality of the techniques of this disclosure may reside in a dedicated server or be included in any other server in addition to or other than NMS 130, or may be distributed throughout network 100, and may or may not form a part of NMS 130.

Figure 4:
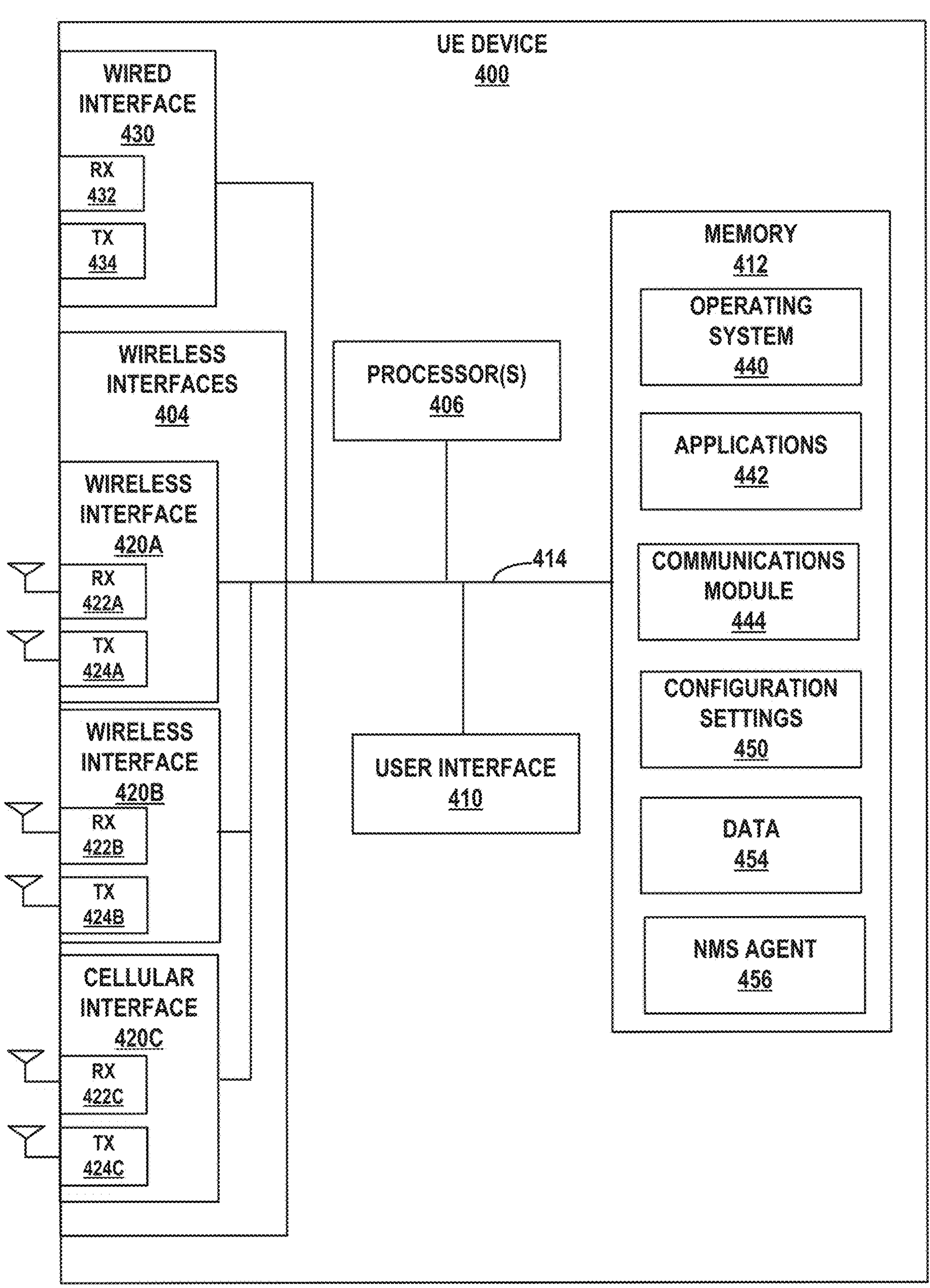
FIG. 4 is a block diagram of an example user equipment device, in accordance with one or more techniques of this disclosure.

FIG. 4 shows an example user equipment (UE) device 400. Example UE device 400 shown in FIG. 4 may be used to implement any of UEs 148 as shown and described herein with respect to FIG. 1A. UE device 400 may include any type of wireless client device, and the disclosure is not limited in this respect. For example, UE device 400 may include a mobile device such as a smart phone, tablet or laptop computer, a personal digital assistant (PDA), a wireless terminal, a smart watch, a smart ring, or any other type of mobile or wearable device. In accordance with techniques described in this disclosure, UE 400 may also include a wired client-side device, e.g., an IoT device such as a printer, a security sensor or device, an environmental sensor, or any other device connected to the wired network and configured to communicate over one or more wireless networks.

UE device 400 includes a wired interface 430, wireless interfaces 420A-420C, one or more processor(s) 406, memory 412, and a user interface 410. The various elements are coupled together via a bus 414 over which the various elements may exchange data and information. Wired interface 430 represents a physical network interface and includes a receiver 432 and a transmitter 434. Wired interface 430 may be used, if desired, to couple, either directly or indirectly, UE 400 to a wired network device, such as one of switches 146 of FIG. 1A, within the wired network via a cable, such as one of Ethernet cables 144 of FIG. 1A.

First, second and third wireless interfaces 420A, 420B, and 420C include receivers 422A, 422B, and 422C, respectively, each including a receive antenna via which UE 400 may receive wireless signals from wireless communications devices, such as APs 142 of FIG. 1A, AP 200 of FIG. 2, other UEs 148, or other devices configured for wireless communication. First, second, and third wireless interfaces 420A, 420B, and 420C further include transmitters 424A, 424B, and 424C, respectively, each including transmit antennas via which UE 400 may transmit wireless signals to wireless communications devices, such as APs 142 of FIG. 1A, AP 200 of FIG. 2, other UEs 148 and/or other devices configured for wireless communication. In some examples, first wireless interface 420A may include a Wi-Fi 802.11 interface (e.g., 2.4 GHz and/or 5 GHz) and second wireless interface 420B may include a Bluetooth interface and/or a Bluetooth Low Energy interface. Third wireless interface 420C may include, for example, a cellular interface through which UE device 400 may connect to a cellular network.

Processor(s) 406 execute software instructions, such as those used to define a software or computer program, stored to a computer-readable storage medium (such as memory 412), such as non-transitory computer-readable mediums including a storage device (e.g., a disk drive, or an optical drive) or a memory (such as Flash memory or RAM) or any other type of volatile or non-volatile memory, that stores instructions to cause the one or more processors 406 to perform the techniques described herein.

Memory 412 includes one or more devices configured to store programming modules and/or data associated with operation of UE 400. For example, memory 412 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 406 to perform the techniques described herein.

In this example, memory 412 includes an operating system 440, applications 442, a communications module 444, configuration settings 450, and data 454. Communications module 444 includes program code that, when executed by processor(s) 406, enables UE 400 to communicate using any of wired interface(s) 430, wireless interfaces 420A-420B and/or cellular interface 450C. Configuration settings 450 include any device settings for UE 400 settings for each of wireless interface(s) 420A-420B and/or cellular interface 420C.

Data 454 may include, for example, a status/error log including a list of events specific to UE 400. The events may include a log of both normal events and error events according to a logging level based on instructions from NMS 130. Data 454 may include any data used and/or generated by UE 400, such as data used to calculate one or more SLE metrics or identify relevant behavior data, that is collected by UE 400 and either transmitted directly to NMS 130 or transmitted to any of APs 142 in a wireless network 106 for further transmission to NMS 130.

As described herein, UE 400 may measure and report network data from data 454 to NMS 130. The network data may comprise event data, telemetry data, and/or other SLE-related data. The network data may include various parameters indicative of the performance and/or status of the wireless network. NMS 130 may determine one or more SLE metrics and store the SLE metrics as network data 137 (FIG. 1A) based on the SLE-related data received from the UEs or client devices in the wireless network. NMS 130 may further update temporal graph database 138 (FIG. 1A) of the network to include the telemetry data, or at least entity and connectivity information extracted from the telemetry data, received from the UEs or client devices in the wireless network over time.

NMS agent 456 is a software agent of NMS 130 that is installed on UE 400. In some examples, NMS agent 456 can be implemented as a software application running on UE 400. NMS agent 456 collects information including detailed client-device properties from UE 400, including insight into UE 400 roaming behaviors. The information provides insight into client roaming algorithms, because roaming is a client device decision. In some examples, NMS agent 456 may display the client-device properties on UE 400. NMS agent 456 sends the client device properties to NMS 130, via an AP device to which UE 400 is connected. NMS agent 456 can be integrated into a custom application or as part of location application. NMS agent 456 may be configured to recognize device connection types (e.g., cellular or Wi-Fi), along with the corresponding signal strength. For example, NMS agent 456 recognizes access point connections and their corresponding signal strengths. NMS agent 456 can store information specifying the APs recognized by UE 400 as well as their corresponding signal strengths. NMS agent 456 or other element of UE 400 also collects information about which APs the UE 400 connected with, which also indicates which APs the UE 400 did not connect with. NMS agent 456 of UE 400 sends this information to NMS 130 via its connected AP. In this manner, UE 400 sends information about not only the AP that UE 400 connected with, but also information about other APs that UE 400 recognized and did not connect with, and their signal strengths. The AP in turn forwards this information to the NMS, including the information about other APs the UE 400 recognized besides itself. This additional level of granularity enables NMS 130, and ultimately network administrators, to better determine the Wi-Fi experience directly from the client device's perspective.

In some examples, NMS agent 456 further enriches the client device data leveraged in service levels. For example, NMS agent 456 may go beyond basic fingerprinting to provide supplemental details into properties such as device type, manufacturer, and different versions of operating systems. In the detailed client properties, the NMS 130 can display the Radio Hardware and Firmware information of UE 400 received from NMS client agent 456. The more details the NMS agent 456 can draw out, the better the VNA/AI engine gets at advanced device classification. The VNA/AI engine of the NMS 130 continually learns and becomes more accurate in its ability to distinguish between device-specific issues or broad device issues, such as specifically identifying that a particular OS version is affecting certain clients.

In some examples, NMS agent 456 may cause user interface 410 to display a prompt that prompts an end user of UE 400 to enable location permissions before NMS agent 456 is able to report the device's location, client information, and network connection data to the NMS. NMS agent 456 will then start reporting connection data to the NMS along with location data. In this manner, the end user of the client device can control whether the NMS agent 456 is enabled to report client device information to the NMS.

Figure 5:
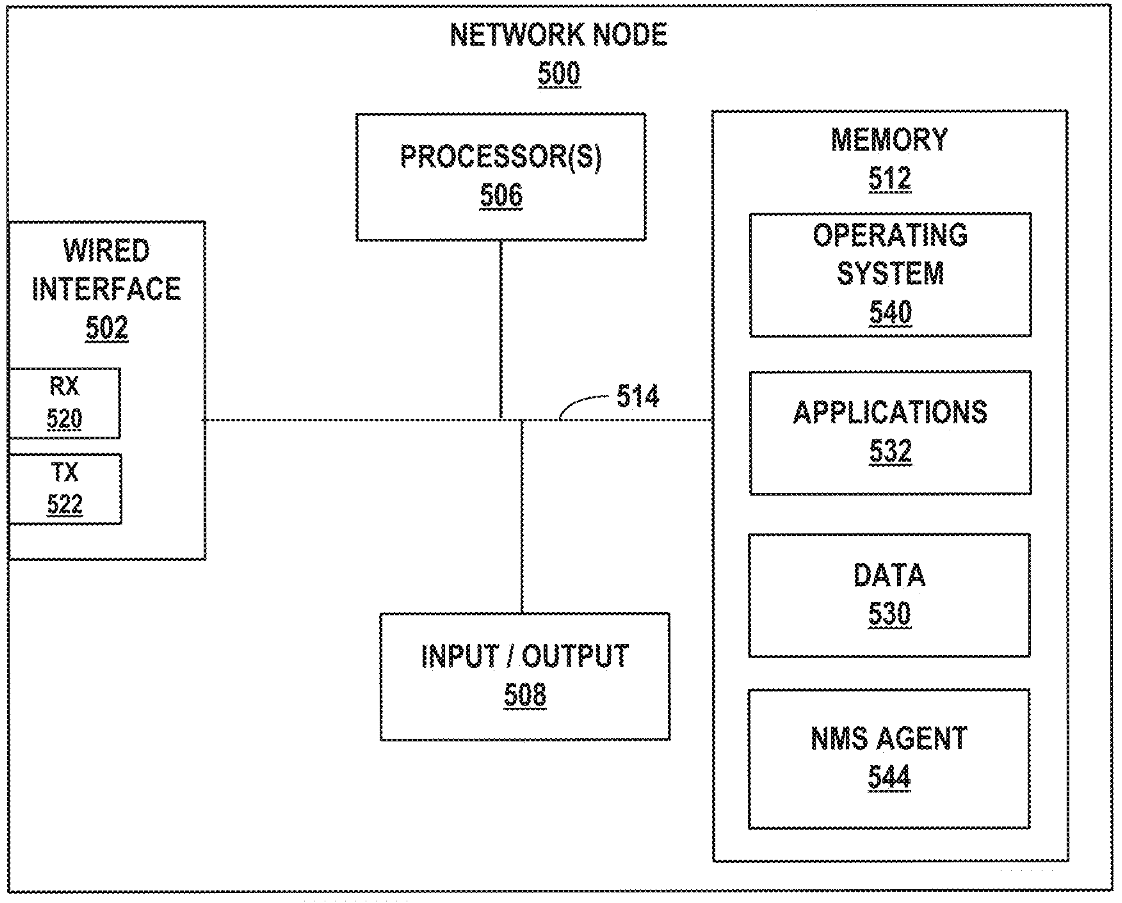
FIG. 5 is a block diagram of an example network node, such as a router or switch, in accordance with one or more techniques of this disclosure.

FIG. 5 is a block diagram illustrating an example network node 500 configured according to the techniques described herein. In one or more examples, the network node 500 implements a device or a server attached to the network 134 of FIG. 1A, e.g., switches 146, AAA server 110, DHCP server 116, DNS server 122, web servers 128, etc., or another network device supporting one or more of wireless network 106, wired LAN 175, or SD-WAN 177, or data center 179 of FIG. 1B, e.g., routers 187.

In this example, network node 500 includes a wired interface 502, e.g., an Ethernet interface, one or more processor(s) 506, input/output 508, e.g., display, buttons, keyboard, keypad, touch screen, mouse, etc., and a memory 512 coupled together via a bus 514 over which the various elements may interchange data and information. Wired interface 502 couples the network node 500 to a network, such as an enterprise network. Though only one interface is shown by way of example, network nodes may, and usually do, have multiple communication interfaces and/or multiple communication interface ports. Wired interface 502 includes a receiver 520 and a transmitter 522.

Memory 512 stores executable software applications 532, operating system 540 and data 530. Data 530 may include a system log and/or an error log that stores event data, including behavior data, for network node 500. In examples where network node 500 comprises a "third-party" network device, the same entity does not own or have access to both the APs or wired client-side devices and network node 500. As such, in the example where network node 500 is a third-party network device, NMS 130 does not receive, collect, or otherwise have access to the network data from network node 500.

In examples where network node 500 comprises a server, network node 500 may receive data and information, e.g., including operation related information, e.g., registration request, AAA services, DHCP requests, Simple Notification Service (SNS) look-ups, and Web page requests via receiver 520, and send data and information, e.g., including configuration information, authentication information, web page data, etc. via transmitter 522.

In examples where network node 500 comprises a wired network device, network node 500 may be connected via wired interface 502 to one or more APs or other wired client-side devices, e.g., IoT devices, within a wired network edge. For example, network node 500 may include multiple wired interfaces 502 and/or wired interface 502 may include multiple physical ports to connect to multiple APs or the other wired-client-side devices within a site via respective Ethernet cables. In some examples, each of the APs or other wired client-side devices connected to network node 500 may access the wired network via wired interface 502 of network node 500. In some examples, one or more of the APs or other wired client-side devices connected to network node 500 may each draw power from network node 500 via the respective Ethernet cable and a Power over Ethernet (PoE) port of wired interface 502.

In examples where network node 500 comprises a session-based router that employs a stateful, session-based routing scheme, network node 500 may be configured to independently perform path selection and traffic engineering. The use of session-based routing may enable network node 500 to eschew the use of a centralized controller, such as an SDN controller, to perform path selection and traffic engineering, and eschew the use of tunnels. In some examples, network node 500 may implement session-based routing as Secure Vector Routing (SVR), provided by Juniper Networks, Inc. In the case where network node 500 comprises a session-based router operating as a network gateway for a site of an enterprise network (e.g., router 187A of FIG. 1B), network node 500 may establish multiple peer paths (e.g., logical path 189 of FIG. 1B) over an underlying physical WAN (e.g., SD-WAN 177 of FIG. 1B) with one or more other session-based routers operating as network gateways for other sites of the enterprise network (e.g., router 187B of FIG. 1B). Network node 500, operating as a session-based router, may collect data at a peer path level, and report the peer path data to NMS 130.

In examples where network node 500 comprises a packet-based router, network node 500 may employ a packet- or flow-based routing scheme to forward packets according to defined network paths, e.g., established by a centralized controller that performs path selection and traffic engineering. In the case where network node 500 comprises a packet-based router operating as a network gateway for a site of an enterprise network (e.g., router 187A of FIG. 1B), network node 500 may establish multiple tunnels (e.g., logical path 189 of FIG. 1B) over an underlying physical WAN (e.g., SD-WAN 177 of FIG. 1B) with one or more other packet-based routers operating as network gateways for other sites of the enterprise network (e.g., router 187B of FIG. 1B). Network node 500, operating as a packet-based router, may collect data at a tunnel level, and the tunnel data may be retrieved by NMS 130 via an API or an open configuration protocol or the tunnel data may be reported to NMS 130 by NMS agent 544 or other module running on network node 500.

The data collected and reported by network node 500 may include periodically-reported data and event-driven data. Network node 500 is configured to collect logical path statistics via bidirectional forwarding detection (BFD) probing and data extracted from messages and/or counters at the logical path (e.g., peer path or tunnel) level. In some examples, network node 500 is configured to collect statistics and/or sample other data according to a first periodic interval, e.g., every 3 seconds, every 5 seconds, etc. Network node 500 may store the collected and sampled data as path data, e.g., in a buffer. In some examples, NMS agent 544 may periodically create a package of the statistical data according to a second periodic interval, e.g., every 3 minutes. The collected and sampled data periodically reported in the package of statistical data may be referred to herein as "oc-stats."

In some examples, the package of statistical data may also include details about clients connected to network node 500 and the associated client sessions. NMS agent 544 may then report the package of statistical data to NMS 130 in the cloud. In other examples, NMS 130 may request, retrieve, or otherwise receive the package of statistical data from network node 500 via an API, an open configuration protocol, or another of communication protocols. The package of statistical data created by NMS agent 544 or another module of network node 500 may include a header identifying network node 500 and the statistics and data samples for each of the logical paths from network node 500. In still other examples, NMS agent 544 reports event data to NMS 130 in the cloud in response to the occurrence of certain events at network node 500 as the events happen. The event-driven data may be referred to herein as "oc-events."

Figure 6:
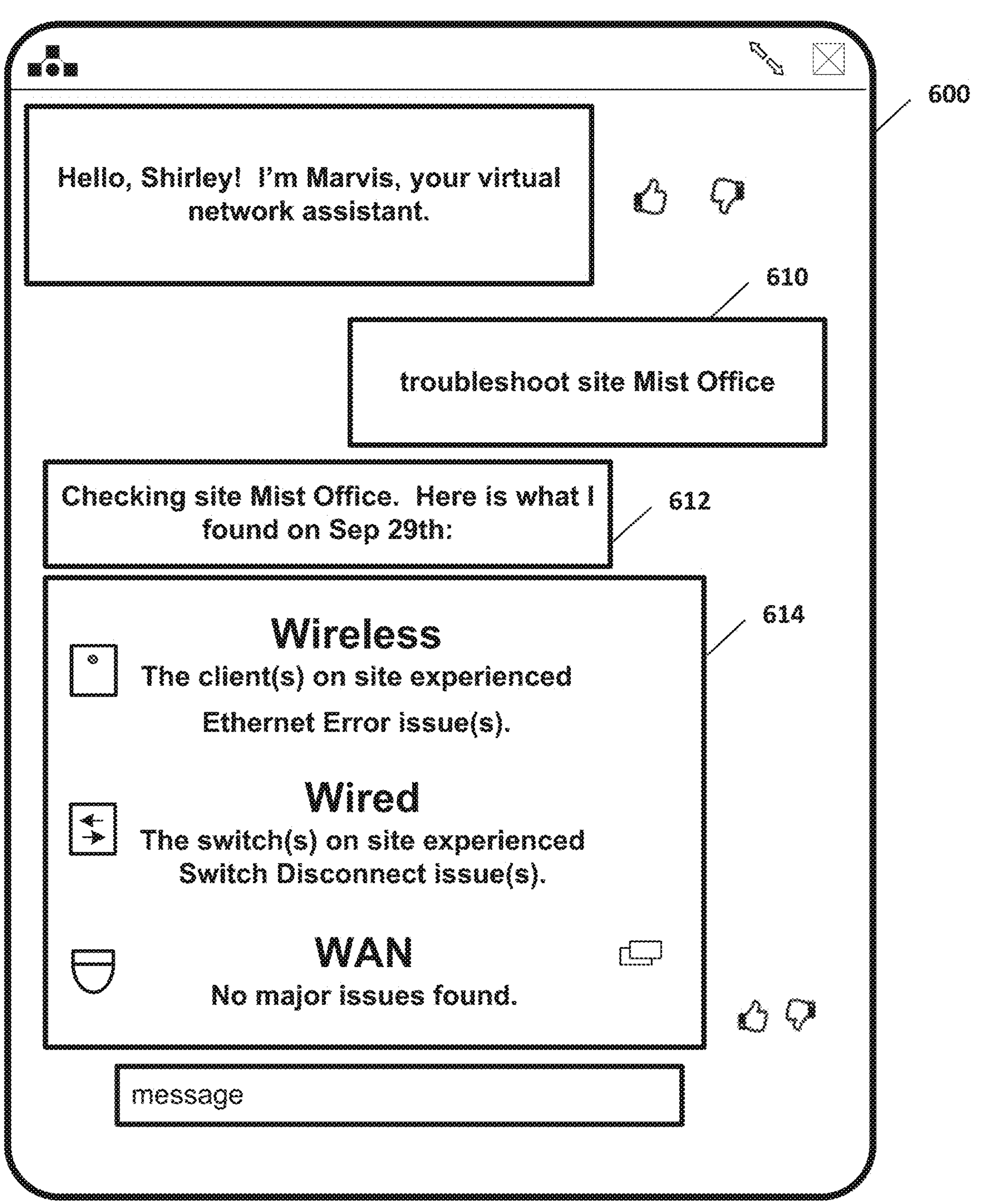
FIG. 6 illustrates example user interface of the network management system for visualization of troubleshooting a site, in accordance with one or more techniques of this disclosure.

FIG. 6 illustrates example user interface 600 of the network management system for visualization of troubleshooting a site, in accordance with one or more techniques of this disclosure. FIG. 6 illustrates an example conversational assistant user interface 600 including a query or user input 610 from an administrator via admin device 111 indicating a site (e.g., Mist Office"), and a response or output 612, 614 generated by conversational assistant engine 136, 356. In the example of FIG. 6, the user input 610 to conversational assistant user interface 600 comprises a string indicating the application and a device identifier (i.e., "troubleshoot site Mist Office," where "Mist Office" indicates the site). The response 612 within conversational assistant user interface 600 comprises a string that states "Checking site Mist Office. Here is what I found on September 30$^{th}$." In addition, conversational assistant user interface 600 presents output 614 as a visualization of at least the first troubleshooting issue, the second troubleshooting issue, and the third troubleshooting issue. In the example of FIG. 6, the output 614 includes a "WAN" string indicating a first troubleshooting issue of "No major issues found" for the WAN deployment, a "wireless" string indicating a second troubleshooting issue of "The client(s) on site experienced Ethernet Error issue(s)" for the wireless deployment, and a "Wired" string indicating a third troubleshooting issue of "The switch(s) on site experienced Switch Disconnect issue(s)" for the wired deployment.

In the example of FIG. 6, the conversational assistant user interface 600 presents output 614 as a visualization of the first troubleshooting issue, the second troubleshooting issue, and the third troubleshooting issue in an ordered list. For example, the conversational assistant user interface 600 presents output 614 as an ordered list of the second troubleshooting issue for the wireless deployment (e.g., "The client(s) on site experienced Ethernet Error issue(s)"), then the third troubleshooting issue for the wired deployment (e.g., "The switch(s) on site experienced Switch Disconnect issue(s).) and then the first troubleshooting issue for the WAN deployment (e.g., "No major issues found").

Figure 7:
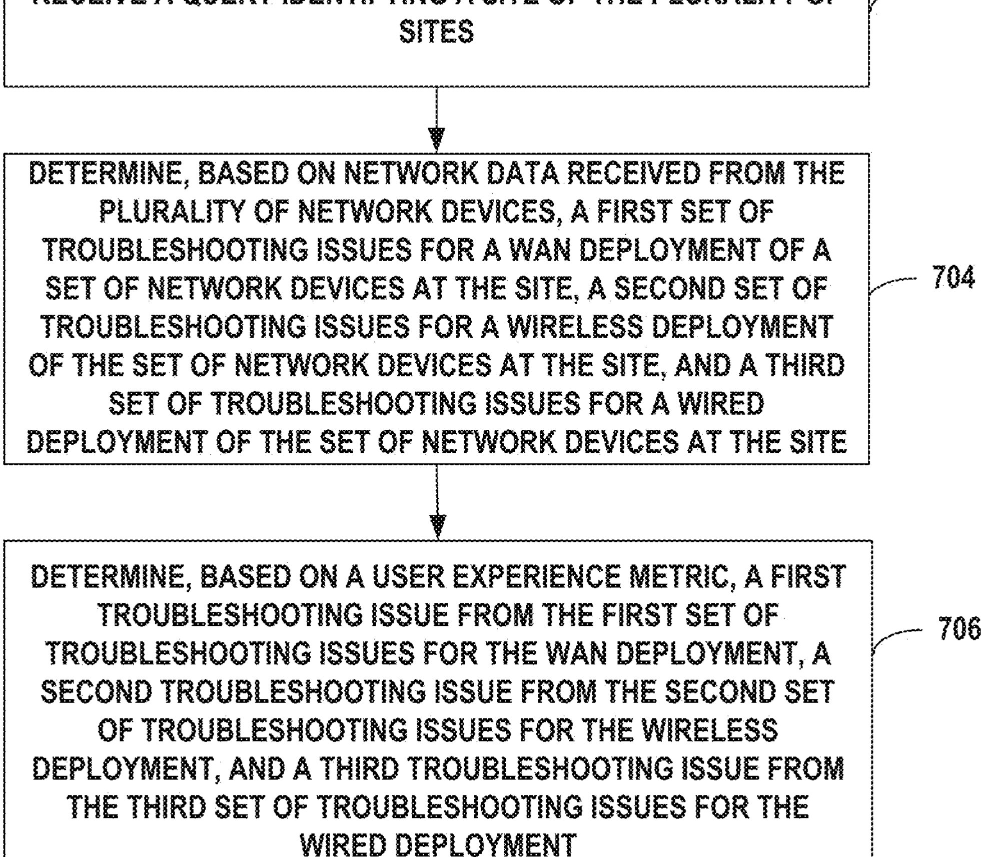
FIG. 7 is a flowchart illustrating an example operation of troubleshooting a site, in accordance with one or more techniques of the disclosure.

FIG. 7 is a flowchart illustrating an example operation of troubleshooting a site, in accordance with one or more techniques of the disclosure. The example operation of FIG. 7 is described herein with respect to NMS 300 of FIG. 3. In other examples, the operation of FIG. 7 may be performed by other computing devices, e.g., NMS 130 of FIGS. 1A-1B.

NMS 300 may receive a query identifying a site of a plurality of sites (702). For example, a human administrator may input a query using admin device 111. In some examples, NMS 300 may apply one or more natural language processors configured to process the user input. A site may include one or more of a WAN deployment, a wireless deployment, or a wired deployment. A WAN deployment may include an intermediate network communicatively coupling the wireless deployment and wired deployment to application services. A wireless deployment may include a wireless access point configured to support one or more of Wi-Fi or Bluetooth. A wired deployment may include one or more network devices of the set of network devices at the site that are connected using physical cables.

NMS 300 may determine, based on network data received from the plurality of network devices, a first set of troubleshooting issues for a WAN deployment of a set of network devices at the site, a second set of troubleshooting issues for a wireless deployment of the set of network devices at the site, and a third set of troubleshooting issues for a wired deployment of the set of network devices at the site (704). For example, NMS 300 may determine one or more of one or more of a client issue, a connectivity issue, or a device health issue for the WAN deployment. Similarly, NMS 300 may determine one or more of one or more of a client issue, a connectivity issue, or a device health issue for the wireless deployment and/or the wired deployment.

NMS 300 may determine, based on a user experience metric, a first troubleshooting issue from the first set of troubleshooting issues for the WAN deployment, a second troubleshooting issue from the second set of troubleshooting issues for the wireless deployment, and a third troubleshooting issue from the third set of troubleshooting issues for the wired deployment (706). For example, NMS 300 may determine, based on the user experience metric (e.g., an SLE score), that the first troubleshooting issue has a highest impact (e.g., a highest SLE score value) to a user experience of the first set of troubleshooting issues for the WAN deployment. Similarly, NMS 300 may determine, based on the user experience metric, that the second troubleshooting issue has a highest impact to a user experience of the second set of troubleshooting issues for the wireless deployment and/or determine, based on the user experience metric, that the third troubleshooting issue has a highest impact to a user experience of the third set of troubleshooting issues for the wired deployment. In some examples, the user experience metric includes a service level expectation (SLE) score.

In some examples, NMS 300 may determine an ordered list of the first troubleshooting issue for the WAN deployment, the second troubleshooting issue for the wireless deployment, and the third troubleshooting issue for the wired deployment. For example, NMS 300 may determine, based on the user experience metric, an ordered list of the first troubleshooting issue for the WAN deployment, the second troubleshooting issue for the wireless deployment, and the third troubleshooting issue for the wired deployment.

NMS 300 may generate data representative of a user interface for presentation on an administrator device, the user interface including a visualization of at least the first troubleshooting issue, the second troubleshooting issue, and the third troubleshooting issue (708). For example, NMS 300 may generate data representative of the user interface illustrated in FIG. 6. In some examples, NMS 300 may generate the user interface to including the visualization of the first troubleshooting issue, the second troubleshooting issue, and the third troubleshooting issue in an ordered list.

In response to receipt of user input selecting an icon representative of the troubleshooting issue, NMS 300 may perform root cause analysis to determine a root cause of one or more of the first troubleshooting issue, the second troubleshooting issue, or the third troubleshooting issue. In this example, NMS 300 may generate data representative of a conversational assistant user interface comprising a platform configured to receive the query identifying the site, present the user interface including the visualization of one or more of the first troubleshooting issue, the second troubleshooting issue, or the third troubleshooting issue, and receive user input interacting with the user interface. NMS 300 may further generate data representative of a troubleshooting user interface for presentation on the administrator device, the troubleshooting user interface including at least one indication of a root cause of the at least one connectivity issue at the network device. In some examples, NMS 300 may identify an action for one or more of the first troubleshooting issue, the second troubleshooting issue, or the third troubleshooting issue. NMS 300 may identify a number of pending actions for one or more of the first troubleshooting issue, the second troubleshooting issue, or the third troubleshooting issue.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively, or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random-access memory (RAM), read-only memory (ROM), non-volatile random-access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A system comprising:

a memory storing network data of a plurality of network devices arranged at a plurality of sites; and one or more processors coupled to the memory and configured to:

receive a query identifying a site of the plurality of sites;

determine, based on the network data of the plurality of network devices, a first set of troubleshooting issues for a wide area network (WAN) deployment of a first set of network devices at the site, a second set of troubleshooting issues for a wireless deployment of a second set of network devices at the site, and a third set of troubleshooting issues for a wired deployment of a third set of network devices at the site;

determine, based on a user experience metric, a first troubleshooting issue from the first set of troubleshooting issues for the WAN deployment, a second troubleshooting issue from the second set of troubleshooting issues for the wireless deployment, and a third troubleshooting issue from the third set of troubleshooting issues for the wired deployment; and generate data representative of a user interface for presentation on an administrator device, the user interface including a visualization of at least the first troubleshooting issue, the second troubleshooting issue, and the third troubleshooting issue.

2. The system of claim 1, wherein, to determine the first set of troubleshooting issues for the WAN deployment, the one or more processors are configured to determine one or more of a client issue, a connectivity issue, or a device health issue for the WAN deployment;

wherein, to determine the second set of troubleshooting issues for the wireless deployment, the one or more processors are configured to determine one or more of a client issue, a connectivity issue, or a device health issue for the wireless deployment; and wherein, to determine the third set of troubleshooting issues for the wired deployment, the one or more processors are configured to determine one or more of a client issue, a connectivity issue, or a device health issue for the wired deployment.

3. The system of claim 1, wherein, to determine the first troubleshooting issue from the first set of troubleshooting issues for the WAN deployment, the one or more processors are configured to determine, based on the user experience metric, the first troubleshooting issue has a highest impact to a user experience of the first set of troubleshooting issues for the WAN deployment;

wherein, to determine the second troubleshooting issue from the second set of troubleshooting issues for the wireless deployment, the one or more processors are configured to determine, based on the user experience metric, the second troubleshooting issue has a highest impact to the user experience of the second set of troubleshooting issues for the wireless deployment; and wherein, to determine the third troubleshooting issue from the third set of troubleshooting issues for the wired deployment, the one or more processors are configured to determine, based on the user experience metric, the third troubleshooting issue has a highest impact to the user experience of the third set of troubleshooting issues for the wired deployment.

4. The system of claim 1, wherein the one or more processors are configured to:

determine, based on the user experience metric, an ordered list of the first troubleshooting issue for the WAN deployment, the second troubleshooting issue for the wireless deployment, and the third troubleshooting issue for the wired deployment, wherein, to generate the data representative of the user interface for presentation on the administrator device, the one or more processors are configured to generate the data representative of the user interface to including the visualization of the first troubleshooting issue, the second troubleshooting issue, and the third troubleshooting issue in the ordered list.

5. The system of claim 1, wherein the user experience metric comprises a service level expectation (SLE) score.

6. The system of claim 1, wherein the one or more processors are configured to perform root cause analysis to determine a root cause of one or more of the first troubleshooting issue, the second troubleshooting issue, or the third troubleshooting issue.

7. The system of claim 1, wherein the one or more processors are configured to generate data representative of a conversational assistant user interface comprising a platform configured to receive the query identifying the site, present the user interface including the visualization of at least the first troubleshooting issue, the second troubleshooting issue, or the third troubleshooting issue, and receive user input interacting with the user interface.

8. The system of claim 1, wherein the one or more processors are configured to identify an action to remediate one or more of the first troubleshooting issue, the second troubleshooting issue, or the third troubleshooting issue.

9. The system of claim 1, wherein the one or more processors are configured to identify a number of pending actions for one or more of the first troubleshooting issue, the second troubleshooting issue, or the third troubleshooting issue.

10. The system of claim 1, wherein the WAN deployment comprises an intermediate network communicatively coupling the wireless deployment and the wired deployment to application services.

11. The system of claim 1, wherein the wireless deployment comprises one or more wireless access point devices configured to support one or more of Wi-Fi or Bluetooth.

12. The system of claim 1, wherein the wired deployment comprises one or more network devices of the third set of network devices at the site that are connected using physical cables.

13. A method comprising:

receiving, by one or more processors, a query identifying a site of a plurality of sites;

determining, by the one or more processors and based on network data of a plurality of network devices arranged at the plurality of sites, a first set of troubleshooting issues for a wide area network (WAN) deployment of a first set of network devices at the site, a second set of troubleshooting issues for a wireless deployment of a second set of network devices at the site, and a third set of troubleshooting issues for a wired deployment of a third set of network devices at the site;

determining, by the one or more processors and based on a user experience metric, a first troubleshooting issue from the first set of troubleshooting issues for the WAN deployment, a second troubleshooting issue from the second set of troubleshooting issues for the wireless deployment, and a third troubleshooting issue from the third set of troubleshooting issues for the wired deployment; and generating, by the one or more processors, data representative of a user interface for presentation on an administrator device, the user interface including a visualization of at least the first troubleshooting issue, the second troubleshooting issue, and the third troubleshooting issue.

14. The method of claim 13, wherein determining the first set of troubleshooting issues for the WAN deployment comprises determining one or more of a client issue, a connectivity issue, or a device health issue for the WAN deployment;

wherein determining the second set of troubleshooting issues for the wireless deployment comprises determining one or more of a client issue, a connectivity issue, or a device health issue for the wireless deployment; and wherein determining the third set of troubleshooting issues for the wired deployment comprises determining one or more of a client issue, a connectivity issue, or a device health issue for the wired deployment.

15. The method of claim 13, wherein determining the first troubleshooting issue from the first set of troubleshooting issues for the WAN deployment comprises determining, based on the user experience metric, the first troubleshooting issue has a highest impact to a user experience of the first set of troubleshooting issues for the WAN deployment;

wherein determining the second troubleshooting issue from the second set of troubleshooting issues for the wireless deployment comprises determining, based on the user experience metric, the second troubleshooting issue has a highest impact to the user experience of the second set of troubleshooting issues for the wireless deployment; and wherein determining the third troubleshooting issue from the third set of troubleshooting issues for the wired deployment comprises determining, based on the user experience metric, the third troubleshooting issue has a highest impact to the user experience of the third set of troubleshooting issues for the wired deployment.

16. The method of claim 13, further comprising:

determining, by the one or more processors and based on the user experience metric, an ordered list of the first troubleshooting issue for the WAN deployment, the second troubleshooting issue for the wireless deployment, and the third troubleshooting issue for the wired deployment, wherein generating the data representative of the user interface for presentation on the administrator device comprises generating the data representative of the user interface to including the visualization of the first troubleshooting issue, the second troubleshooting issue, and the third troubleshooting issue in the ordered list.

17. The method of claim 13, wherein the user experience metric comprises a service level expectation (SLE) score.

18. The method of claim 13, further comprising performing, by the one or more processors, root cause analysis to determine a root cause of one or more of the first troubleshooting issue, the second troubleshooting issue, or the third troubleshooting issue.

19. The method of claim 13, further comprising generating, by the one or more processors, data representative of a conversational assistant user interface comprising a platform configured to receive the query identifying the site, present the user interface including the visualization of at least the first troubleshooting issue, the second troubleshooting issue, or the third troubleshooting issue, and receive user input interacting with the user interface.

20. Non-transitory computer-readable storage media comprising instructions that, when executed by one or more processors, cause the one or more processors to:

receive a query identifying a site of a plurality of sites;

determine, based on network data of a plurality of network devices arranged at the plurality of sites, a first set of troubleshooting issues for a wide area network (WAN) deployment of a first set of network devices at the site, a second set of troubleshooting issues for a wireless deployment of a second set of network devices at the site, and a third set of troubleshooting issues for a wired deployment of a third set of network devices at the site;

determine, based on a user experience metric, a first troubleshooting issue from the first set of troubleshooting issues for the WAN deployment, a second troubleshooting issue from the second set of troubleshooting issues for the wireless deployment, and a third troubleshooting issue from the third set of troubleshooting issues for the wired deployment; and generate data representative of a user interface for presentation on an administrator device, the user interface including a visualization of at least the first troubleshooting issue, the second troubleshooting issue, and the third troubleshooting issue.

* * * * *